US009558685B2

(12) United States Patent
Lee et al.

(10) Patent No.: US 9,558,685 B2
(45) Date of Patent: Jan. 31, 2017

(54) WALL MOUNTING-TYPE FLEXIBLE DISPLAY

(71) Applicant: LG ELECTRONICS INC., Seoul (KR)

(72) Inventors: Cheonhee Lee, Seoul (KR); Dongwon Choi, Seoul (KR); Sangchul Han, Seoul (KR); Sungjung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/895,455

(22) PCT Filed: Mar. 7, 2014

(86) PCT No.: PCT/KR2014/001899
§ 371 (c)(1),
(2) Date: Dec. 2, 2015

(87) PCT Pub. No.: WO2014/196724
PCT Pub. Date: Dec. 11, 2014

(65) Prior Publication Data
US 2016/0111028 A1    Apr. 21, 2016

(30) Foreign Application Priority Data

Jun. 4, 2013    (KR) .................. 10-2013-0064101

(51) Int. Cl.
*G06F 1/16*    (2006.01)
*H05K 5/00*    (2006.01)
(Continued)

(52) U.S. Cl.
CPC ................ *G09F 9/35* (2013.01); *F16M 13/02* (2013.01); *G09F 9/301* (2013.01);
(Continued)

(58) Field of Classification Search
CPC ........ G06F 1/16; G06F 1/1601; G06F 1/1633; G06F 1/1652; G06F 1/1654
(Continued)

(56) References Cited

U.S. PATENT DOCUMENTS 6,269,571 B1     8/2001  Thalenfeld
7,667,962 B2 *   2/2010  Mullen ................. G06F 1/1624
                                                              359/461

(Continued)

FOREIGN PATENT DOCUMENTS

KR    10-2009-0120354 A    11/2009
KR    10-2011-0104634 A    9/2011
KR    10-2013-0007311 A    1/2013

OTHER PUBLICATIONS

International Search Report and Written Opinion dated Jun. 2, 2014 issued in Application No. PCT/KR2014/001899 (with English translation).

(Continued)

*Primary Examiner* — Anthony Haughton
(74) *Attorney, Agent, or Firm* — KED & Associates, LLP

(57) ABSTRACT

The present invention relates to a wall mounting-type flexible display, which can be mounted on a wall, the display comprising: a display panel having a bending portion having a bent peripheral area; a support bar for supporting the display panel by being in contact with the bending portion; and a bracket coupled to the support bar and fixed to a wall surface, wherein the bending portion of the display panel comprises at least two curved surfaces having at least one inflection point, and the first and second curved surfaces, which are adjacent to each other about the inflection point, may have different curvatures. The first curved surface is directly adjacent to the end portion of the display panel, the second curved surface is adjacent to the first curved surface while being spaced from the end portion of the display (Continued)

panel, and the curvature of the first curved surface may be larger than the curvature of the second curved surface.

20 Claims, 38 Drawing Sheets

(51) Int. Cl.
 *H05K 7/00* (2006.01)
 *G09F 9/35* (2006.01)
 *G09F 15/00* (2006.01)
 *F16M 13/02* (2006.01)
 *G09F 27/00* (2006.01)
 *G09F 9/30* (2006.01)

(52) U.S. Cl.
 CPC ...... *G09F 15/0031* (2013.01); *G09F 15/0037* (2013.01); *G09F 27/00* (2013.01)

(58) Field of Classification Search
 USPC .............. 361/679.21–679.3, 679.55, 679.56; 248/917–924
 See application file for complete search history.

(56) References Cited

U.S. PATENT DOCUMENTS

| | | | |
|---|---|---|---|
| 8,035,577 B2* | 10/2011 | Lafarre | G06F 1/1615 248/917 |
| 8,379,377 B2* | 2/2013 | Walters | G06F 1/1641 248/917 |
| 8,605,421 B2* | 12/2013 | Verschoor | G06F 1/1652 361/679.21 |
| 8,654,519 B2* | 2/2014 | Visser | G09F 9/00 361/679.21 |
| 9,123,290 B1* | 9/2015 | Cho | G06F 1/1652 |
| 9,338,905 B2* | 5/2016 | Ahn | H01L 51/5237 |
| 9,395,758 B2* | 7/2016 | Zhang | G06F 1/1601 |
| 2005/0041012 A1* | 2/2005 | Daniel | G06F 1/1601 345/156 |
| 2010/0060548 A1 | 3/2010 | Choi et al. | |
| 2012/0274575 A1 | 11/2012 | Solomon et al. | |
| 2013/0155655 A1* | 6/2013 | Lee | H05K 5/03 362/97.1 |
| 2014/0198465 A1* | 7/2014 | Park | H05K 5/0226 361/749 |
| 2015/0035812 A1* | 2/2015 | Shin | G09G 3/3688 345/204 |

OTHER PUBLICATIONS

International Search Report dated Jun. 2, 2014 issued in Application No. PCT/KR2014/001899 (with English translation).
European Search Report dated Nov. 14, 2016 issued in Application No. 14807638.3.

\* cited by examiner

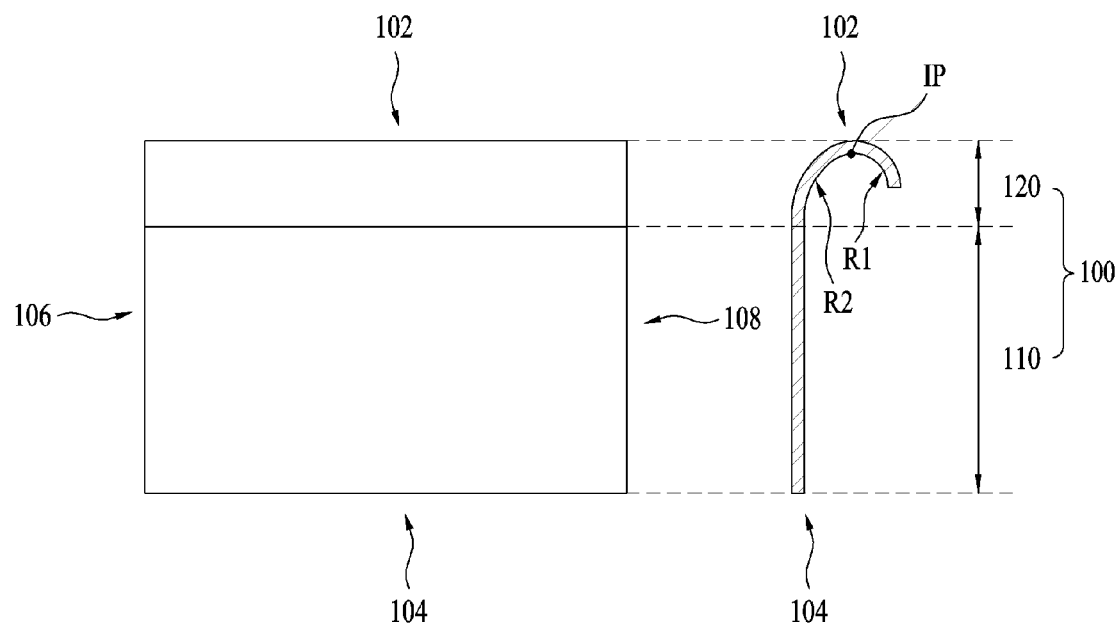
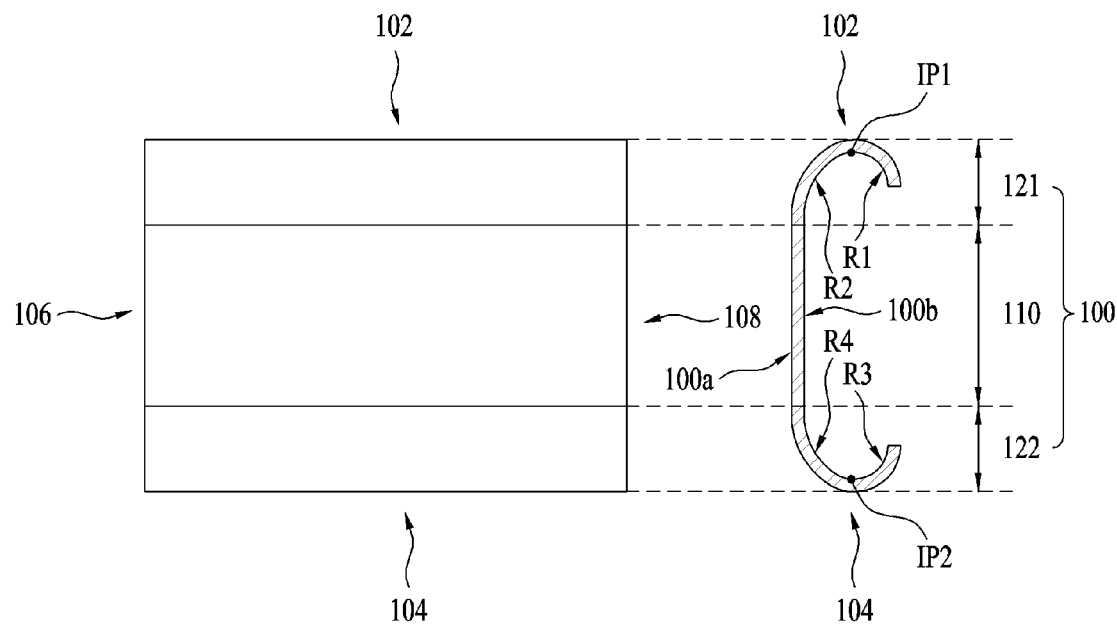

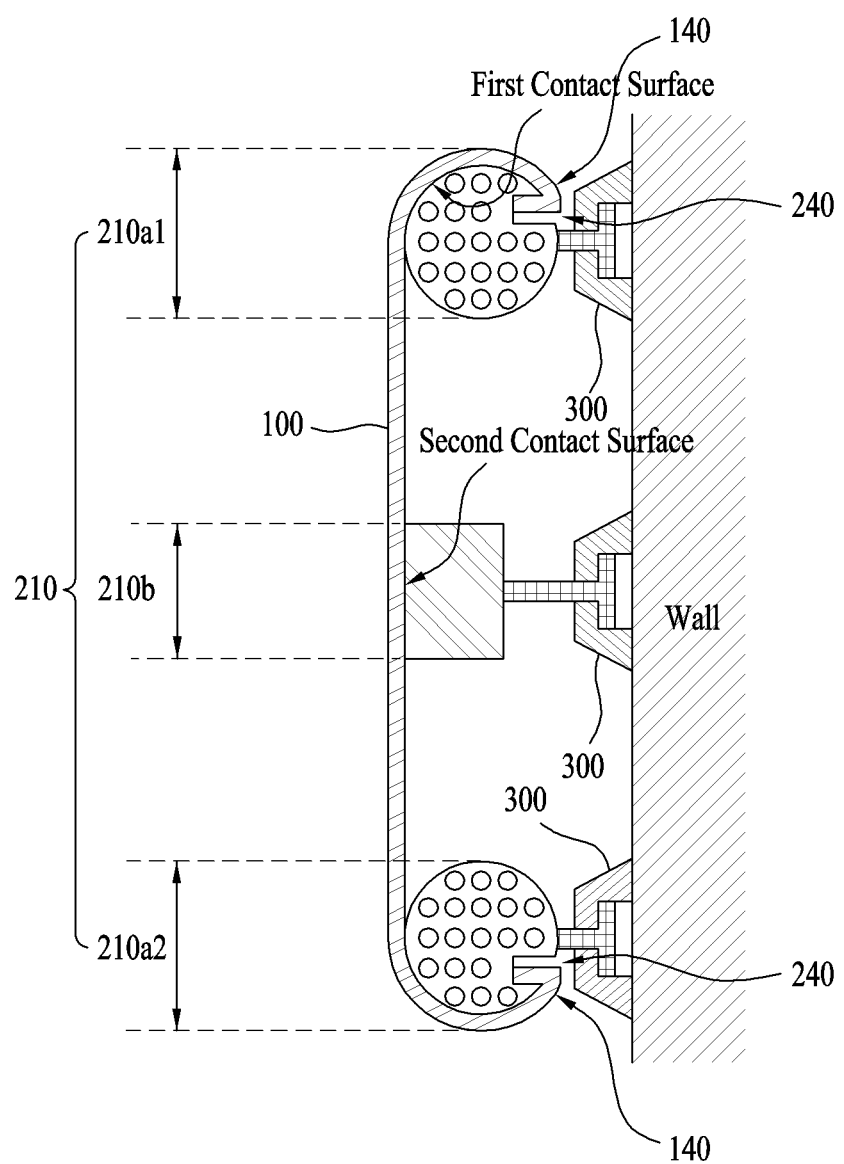

WALL MOUNTING-TYPE FLEXIBLE DISPLAY

CROSS-REFERENCE TO RELATED PATENT APPLICATIONS

This application is a U.S. National Stage Application under 35 U.S.C. §71 of PCT Application No. PCT/KR2014/001899, filed Mar. 7, 2014, which claims priority to Korean Patent Application No. 10-2013-0064101, filed Jun. 4, 2013, whose entire disclosures are hereby incorporated by reference.

TECHNICAL FIELD

The present invention relates to a flexible display, and more particularly to a wall-mounted flexible display device capable of being hung on a wall.

BACKGROUND ART

Generally, a flexible display is applied to a liquid crystal display, an organic electroluminescent (EL) device, or the like, to provide flexibility enabling folding and unfolding to the display through replacement of a glass substrate with a plastic substrate.

Such a flexible display is not only light and strong against impact, but is also flexible or bendable and, as such, may be manufactured to have various shapes.

Furthermore, such a flexible display may display image information not only in a flat state, but also in a bent state. As such, active research into flexible displays is being conducted.

However, since such a flexible display, which has flexibility to provide bendability, is very thin and light, there is a difficulty in stably installing the flexible display at a desired place.

In particular, if the installation place is a wall, damage to the flexible display may occur due to a complex installation process required when a wall-mounted bracket is used as in conventional cases.

Therefore, a wall-mounted flexible display capable of being stably and conveniently mounted to a wall while maintaining advantages thereof provided by virtue of flexibility to provide bendability needs to be developed.

DISCLOSURE

Technical Problem

An object of the present invention is to provide a wall-mounted flexible display, which includes a bending section configured to be hooked on a support bar fixed to a wall, thereby achieving simple and stable installation of the display.

Another object of the present invention is to provide a wall-mounted flexible display in which speakers are disposed at a support bar to be fixed to a wall, so as to be separated from a display panel.

Another object of the present invention is to provide a wall-mounted flexible display, which includes an auxiliary display disposed at a bending section of a display panel, to perform display of various functions and a mood lighting function.

Technical Solution

The object of the present invention can be achieved by providing a wall-mounted flexible display including a display panel having a bending section provided at an edge region of the display panel while having a curved structure, a support bar contacting the bending section of the display panel, thereby supporting the display panel, and a bracket coupled to the support bar while being fixed to a wall, wherein the bending section of the display panel includes at least two curved surfaces forming at least one inflection point, and the at least two curved surfaces include a first curved surface and a second curved surface, which have different curvatures.

The first curved surface may be immediately adjacent to an end portion of the display panel. The second curved surface may be adjacent to the first curved surface while being spaced apart from the end portion of the display panel. The curvature of the first curved surface may be greater than the curvature of the second curved surface.

The first curved surface may be bent toward a back surface of the display panel.

A fastening portion to be fastened to the support bar may be provided at the first curved surface. An auxiliary display for display of functions may be provided at the second curved surface.

The first curved surface may be bent toward a front surface of the display panel.

A fastening portion to be fastened to the support bar and an auxiliary display for display of functions may be provided at the first curved surface.

The auxiliary display may be arranged at a rear surface of the display panel. The fastening portion may be arranged at the front surface of the display panel.

The display panel may include a main display arranged at a central region of the display panel, for display of images, and an auxiliary display arranged at the bending section, for display of functions.

The bending section of the display panel may be provided with at least one connecting terminal for electrical connection of the display panel to the support bar.

The connecting terminal may be arranged at the back surface of the display panel.

The edge region of the display panel may include left and right edge regions opposite to each other, and upper and lower edge regions opposite to each other. The bending section may be arranged at at least one of the upper and lower edge regions.

The display panel may have a horizontal length greater than a vertical length of the display panel. The support bar may have a length greater than the horizontal length of the display panel.

The support bar may include a body contacting the bending section of the display panel, thereby supporting the display panel, speakers each arranged at a predetermined region of the body, to output an audio signal from the display panel, and at least one connecting terminal arranged at a predetermined region of the body, for electrical connection between the speakers and the display panel.

The body may be provided with a fastening groove for fastening of the body to the bending section of the display panel.

The body may also be provided with a guide groove to contact the bending section of the display panel.

The body may have a curved surface at a region thereof contacting the bending section of the display panel. The curved surface of the body may have a curvature equal to the curvature of the first curved surface in the bending section or the curvature of the second curved surface in the bending section.

Alternatively, the body may have a curved surface at a region thereof contacting the bending section of the display panel while including a third curved surface corresponding to the first curved surface of the bending section in the display panel, and a fourth curved surface corresponding to the second curved surface of the bending section in the display panel. The third curved surface of the body may have a curvature equal to the curvature of the first curved surface in the bending section. The fourth curved surface of the body may have a curvature equal to the curvature of the second curved surface in the bending section.

The body may include a speaker driver for driving the speakers, and a power supply for supplying electric power to the speaker driver and the speakers.

The body may include at least one main body for supporting the bending section of the display panel, and at least one auxiliary body spaced apart from the main body by a predetermined distance, to support a region of the display panel, except for the bending section. The main body and the auxiliary body may be electrically connected.

The auxiliary body may have a flat surface arranged at a region thereof contacting the display panel, and a movement preventing groove for fixing the display panel.

The main body may include speakers, and a speaker driver for driving the speakers. The auxiliary body may include a panel driver for driving the display panel, and a power supply for supply electric power to the display panel and the speakers.

Advantageous Effects

In accordance with the present invention, it may be possible to simply and stably mount the display panel to a wall by configuring the bending section of the display panel such that the bending section is hooked on the support bar fixed to the wall.

In accordance with the present invention, it may also be possible to separate the speakers from the display panel by arranging the speakers at the support bar fixed to a wall and, as such, the speakers may be installed while having various arrangements.

In accordance with the present invention, the auxiliary display may be arranged at the bending section of the display panel and, as such, display of various functions for recognition of the functions may be possible. In addition, a mood lighting function according to ambient brightness may be carried out.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF DRAWINGS

FIGS. 9A to 9D are views illustrating positions of bending sections of display panels, respectively.

FIGS. 20A to 20C are views illustrating auxiliary bodies of support bars.

BEST MODE

Figure 1A:
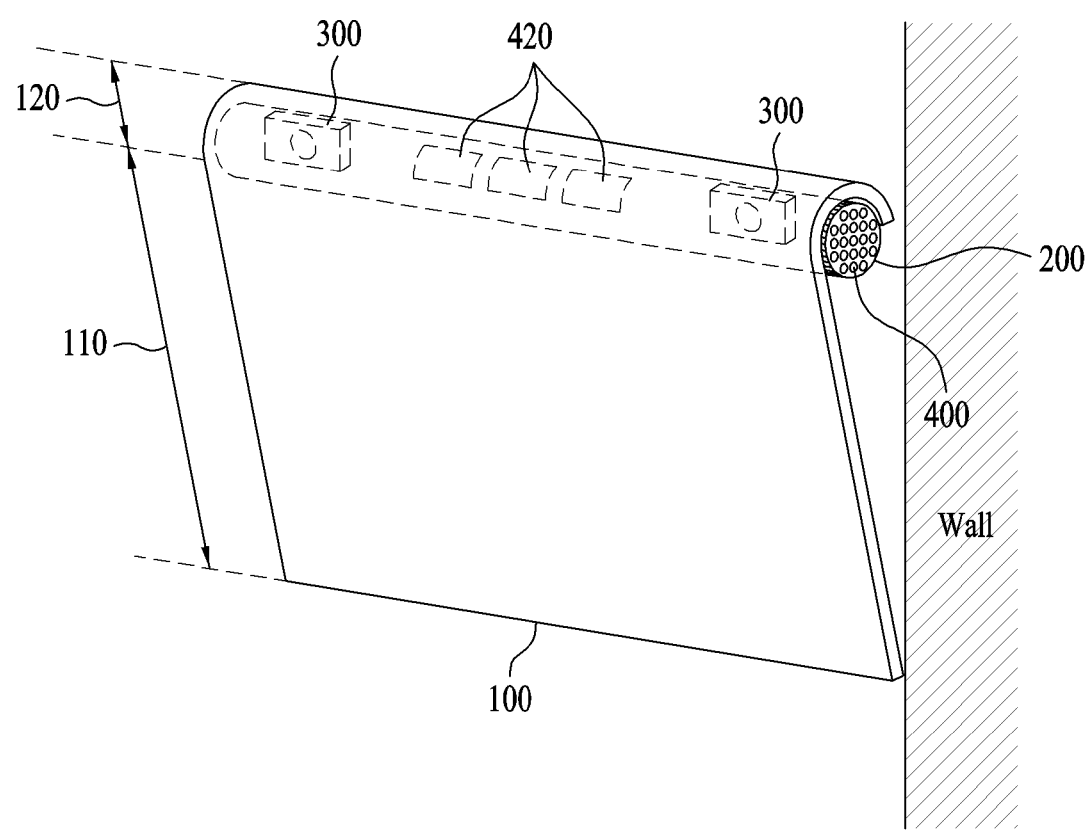
FIGS. 1A and 1B are views illustrating a wall-mounted flexible display according to an embodiment of the present invention.

Hereinafter, preferred embodiments of the present invention will be described in detail with reference to the accompanying drawings, and the same or similar elements are designated by the same numeral references regardless of the numerals in the drawings and redundant description thereof will be omitted. The suffixes "module" and "unit" of elements herein are used for convenience of description and thus can be used interchangeably and do not have any distinguishable meanings or functions. In describing the present invention, moreover, the detailed description will be omitted when a specific description of publicly known technologies to which the invention pertains is judged to obscure the gist of the present invention. In addition, it should be noted that the accompanying drawings are merely illustrated to easily explain the spirit of the invention, and therefore, should not be construed as limiting the spirit of the invention by the accompanying drawings. On the contrary, the invention is to cover all modifications, equivalents, and alternatives falling within the spirit and scope of the invention as defined by the claims.

In the meantime, although terms including an ordinal number, such as first or second, may be used to describe a variety of constituent elements, the constituent elements are not limited to the terms, and the terms are used only for the purpose of discriminating one constituent element from other constituent elements.

It will be understood that when one element is referred to as being "connected to" or "coupled to" another element, one element may be "connected to" or "coupled to" another element via a further element although one element may be directly connected to or directly coupled to another element. On the other hand, it will be understood that, when an element is referred to as being "directly connected to" or "directly coupled to" another element, there is no intervening element present.

As used in the description of the invention and the appended claims, the singular forms "a", "an" and "the" are intended to include the plural forms as well, unless context clearly indicates otherwise.

It will be further understood that the terms "comprises" and/or "comprising," or "includes" and/or "including" when used in this specification, specify the presence of stated features, regions, integers, steps, operations, elements, and/or combinations thereof, but do not preclude the presence or addition of one or more other features, regions, integers, steps, operations, elements, components, and/or combinations thereof.

Figure 1B:
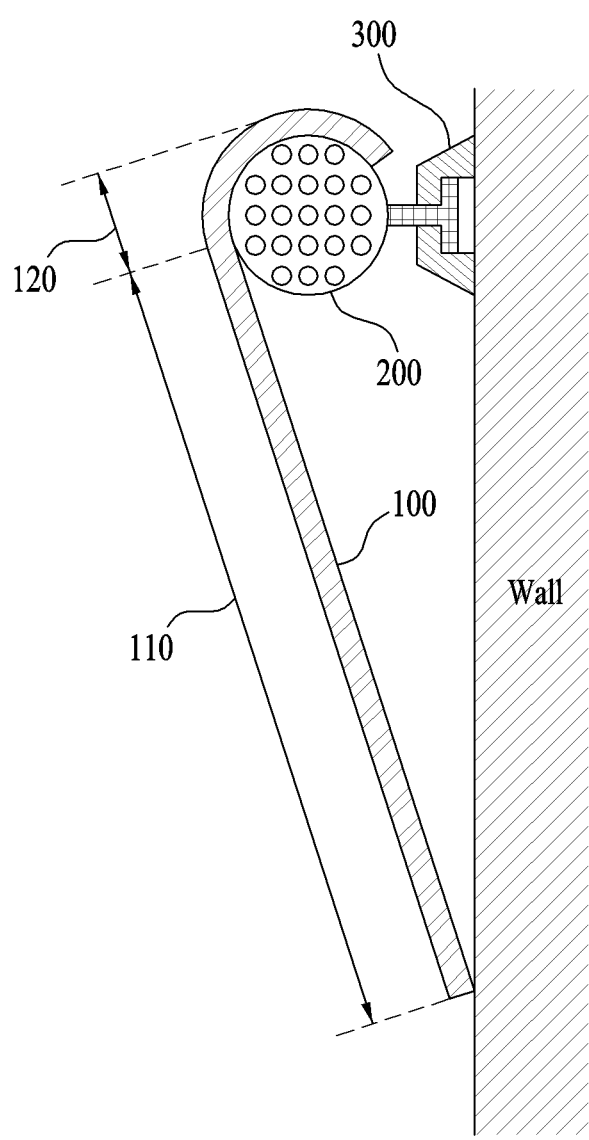

FIGS. 1A and 1B are views illustrating a wall-mounted flexible display according to an embodiment of the present invention. FIG. 1A is a perspective view, and FIG. 1B is a side view.

As illustrated in FIGS. 1A and 1B, the wall-mounted flexible display may include a display panel 100, a support bar 200, and a bracket 300.

In this case, the display panel 100 may include a bending section 120 provided at an edge region of the display panel 100 while having a curved structure.

In this case, the display panel 100 may be a liquid crystal display, an organic electroluminescent (EL) display, or the like. The display panel 100 includes a substrate constituted by a circuit pattern and a film disposed on at least one of upper and lower surfaces of the circuit pattern while having flexibility and insulation properties.

For example, the film of the substrate may be made of a material selected from the group consisting of photosensitive solder resist (photosolderresist) (PSR), polyimide, epoxy (for example, FR-4), and combinations thereof.

When the substrate includes films disposed on the upper and lower surfaces of the circuit pattern, respectively, the film disposed on the upper surface of the circuit pattern may differ from the film disposed on the lower surface of the circuit pattern, if necessary.

In another embodiment, the substrate of the display panel may be a printed circuit board (PCB) made of a material selected from the group consisting of polyethylene terephthalate (PET), glass, polycarbonate (PC), silicon (Si), polyimide, and epoxy. For example, a single-layer PCB, a multilayer PCB, a ceramic board, a metal core PCB, or the like may be selectively used.

Meanwhile, the display panel 100 may include a flat section 110 having a flat surface, and the bending section 120, which has a curved surface.

In this case, the flat section 110 of the display panel 100 may be arranged at a central region of the display panel 100, and the bending section 120 of the display panel 100 may be arranged at an edge region of the display panel 100.

In addition, the flat section 110 of the display panel 100 may include a main display for display of images. The bending section 120 of the display panel 100 may include an auxiliary display for display of various functions associated with operation of the display.

For example, the auxiliary display may display at least one of an electrical connection state between the display panel 100 and the support bar 200, an audio level state of speakers representing a plurality of frequency ranges, and an operation state of the display panel 100.

In addition, the auxiliary display may include at least one sensor for sensing ambient brightness and, as such, may perform a mood lighting function for adjusting luminance in accordance with ambient brightness.

The bending section 120 of the display panel 100 may also be provided with at least one connecting terminal 420 for electrical connection of the display panel 100 to the support bar 200.

In this case, the connecting terminals 420 may be arranged at the back surface of the display panel 100.

If necessary, the bending section 120 of the display panel 100 may be provided with a plurality of function buttons for activation of functions of the display panel.

The function buttons may be disposed at the front surface of the display panel 100.

In addition, the bending section 120 of the display panel 100 may be provided with at least one fastening protrusion at an end portion thereof, to fasten the display panel 100 to the support bar 200.

Meanwhile, the display panel 100 may include a plurality of bending sections 120.

For example, when the edge region of the display panel 100 includes left and right edge regions opposite to each other, and upper and lower edge regions perpendicular to the left and right edge regions while being opposite to each other, bending sections 120 may be provided at the upper and lower edge regions of the display panel 100, respectively.

Meanwhile, the support bar 200 contacts the bending section 120 of the display panel 100, to support the display panel 100.

In this case, the support bar 200 may include speakers 400 for outputting an audio signal from the display panel 100.

To this end, the support bar 200 may include at least one connecting terminal for electrical connection between the speakers 400 and the display panel 100.

The support bar 200 may further include a speaker driver for driving the speakers 400, and a power supply for supplying electric power to the speaker driver and the speakers 400.

If necessary, the support bar 200 may further include a wireless power receiver for receiving electric power transmitted from an external wireless power transmitter in a wireless manner.

Meanwhile, the support bar 200 may include a plurality of body sections. The body sections of the support bar 200 may be spaced apart from one another by a predetermined distance while being electrically connected.

In this case, the body sections of the support bar 200 may include a main body section and an auxiliary body section. The main body section may support the bending section 120 of the display panel 100. The auxiliary body section may support a portion of the display panel 100, except for the bending section 120, namely, the flat section 110.

If necessary, the main body section may include the speakers 400, and the speaker driver for driving the speakers 400, and the auxiliary body section may include a panel driver, and the power supply for supply electric power to the display panel 100 and speakers 400.

When the support bar 200 includes a plurality of body sections, as described above, it may be possible to arrange drive circuits of the display at the plurality of body sections so as to be separated from the display panel and, as such, the weight of the display may be reduced. Accordingly, the flexible display may be stably and simply mounted to a wall.

The speakers 400 may be arranged at opposite end portions of the support bar 200 exposed from the display panel 100.

If necessary, the speakers 400 may be arranged at a central portion of the support bar 200 disposed behind the display panel 100.

In another case, the speaker 400 may be arranged at respective body sections of the support bar 200.

In this case, the speakers 400 may have different output frequency ranges.

The bracket 300 may be fixed to a wall in a state of being coupled to the support bar 200.

The bracket 300 may include a fixed section and a fastening pin. The fixed section may include at least one hole, and may be attached to a wall.

In this case, the hole of the fixed section may include an insertion hole, into which the fastening pin is inserted, and a seating hole, in which the fastening pin is seated.

The fastening pin may be fastened to the support bar 200 in a state of being inserted into the hole of the fixed section. The fastening pin may include a first pin having a first diameter, and a second pin connected to the first pin while having a second diameter.

In this case, the first diameter and second diameter may be different.

The wall-mounted flexible display configured as described above may be simply and stably mounted to a wall as the bending section 120 of the display panel 100 is hooked on the support bar 200 fixed to the wall.

In addition, in accordance with the present invention, the speakers 400 may be separated from the display panel 100 as the speakers 400 are disposed at the support bar 200. Accordingly, the speakers 400 may be installed while having various arrangements.

In accordance with the present invention, the auxiliary display is also provided at the bending section 120 of the display panel 100 and, as such, display of various functions for recognition of the functions may be possible. In addition, a mood lighting function according to ambient brightness may be carried out.

Figure 2:
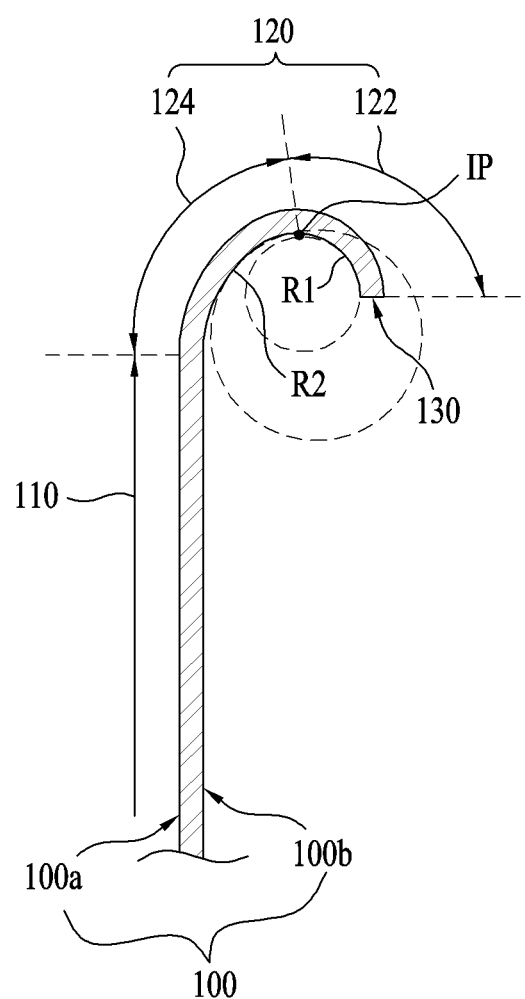
FIG. 2 is a sectional view illustrating a bending section in the display panel of FIG. 1 according to a first embodiment.

FIG. 2 is a sectional view illustrating a bending section in the display panel of FIG. 1 according to a first embodiment.

As illustrated in FIG. 2, the display panel 100 may include a flat section 110 having a flat surface, and a bending section 120 having a curved surface.

In this case, the flat section 110 of the display panel 100 may be arranged at a central region of the display panel 100, and the bending section 120 of the display panel 100 may be arranged at an edge region of the display panel 100.

In addition, the bending section 120 of the display panel 100 may include at least two curved surfaces forming at least one inflection point IP.

In this case, first and second curved surfaces 122 and 124 adjacent to each other at the inflection point IP may have different curvatures.

For example, when the bending section 120 of the display panel 100 is bent from a front surface 100a of the display panel 100 toward a back surface 100b of the display panel 100, the first curved surface 122 of the bending section 120 may be immediately adjacent to an end portion 130 of the display panel, and the second curved surface 24 of the bending section 120 may be adjacent to the first curved surface 122 while being spaced apart from the end portion 130 of the display panel 100.

In this case, the curvature of the first curved surface 122, namely, a curvature R1 may be greater than the curvature of the second curved surface 124, namely, a curvature R2.

When the curvature R1 of the first curved surface 122 is greater than the curvature R2 of the second curved surface 124, the first curved surface 122 of the bending section 120 may come into close contact with the support bar and, as such, the bending section 120 of the display panel 100 may be stably fastened to the support bar.

That is, since the display of the present invention is a wall-mounted display simply installable through hooking of the display panel 100 on the support bar, the bending section 120 of the display panel 100 should be stably in close contact with the support bar in order to prevent the display panel 100 from being separated from the support bar.

In addition, when the support bar of the present invention performs an additional function of the display, for example, a speaker function, the bending section 120 of the display panel 100 should be stably in close contact with the support bar in order to achieve contact between an electrical connecting terminal of the display panel 100 and an electrical connecting terminal of the support bar, for electrical connection between the display panel 100 and the support bar.

To this end, in the present invention, the curvature R1 of the first curved surface 122 in the bending section 120 may differ from the curvature R2 of the second curved surface 124 in the bending section 120 in order to achieve stable fastening of the bending section 120 in the display panel 100 to the support bar.

Figure 3:
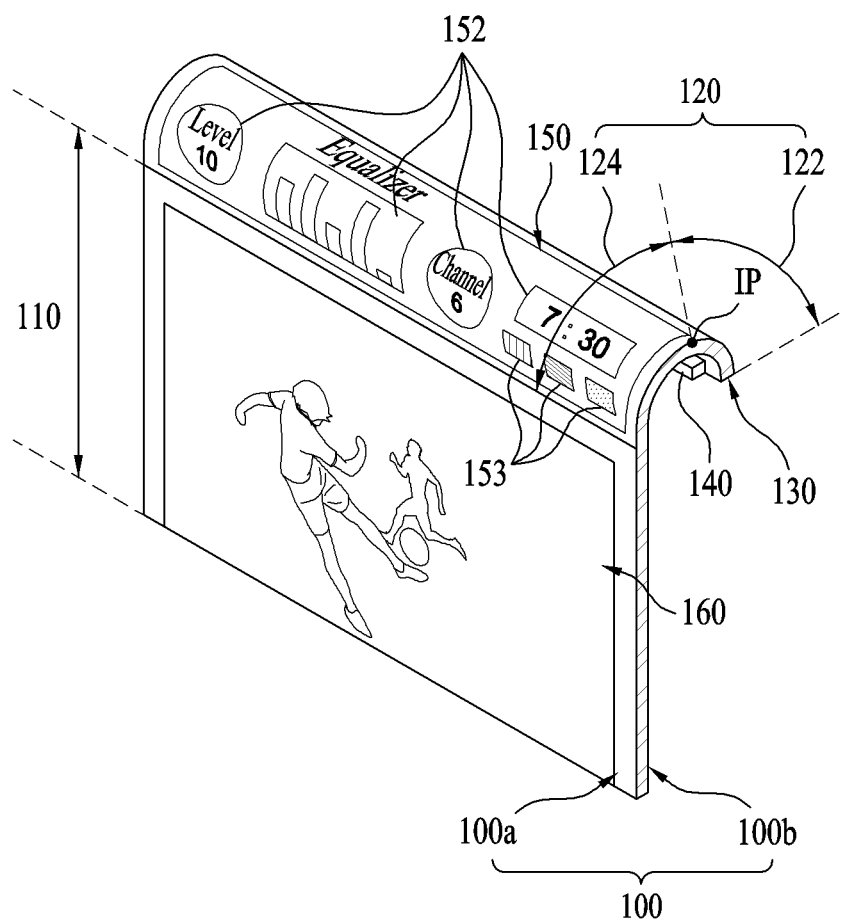
FIG. 3 is a view illustrating an auxiliary display disposed at the bending section of FIG. 2.

FIG. 3 is a view illustrating an auxiliary display disposed at the bending section of FIG. 2.

As illustrated in FIG. 3, the display panel 100 may include the flat section 110, which has a flat surface, and the bending section 120, which has a curved surface.

In this case, the flat section 110 of the display panel 100 may be arranged at a central region of the display panel 100, and the bending section 120 of the display panel 100 may be arranged at an edge region of the display panel 100.

In addition, the bending section 120 of the display panel 100 may include at least two curved surfaces forming at least one inflection point IP.

In this case, first and second curved surfaces 122 and 124 adjacent to each other at the inflection point IP may have different curvatures.

In this case, the first curved surface 122 of the bending section 120 may be a curved surface bent toward a back surface 100b of the display panel 100.

A fastening portion 140 to be fastened to the support bar may be provided at the first curved surface 122 of the bending section 120.

The fastening portion 140 provided at the first curved surface 122 may be a fastening protrusion protruding from an end of the back surface 100b of the display panel 100.

In addition, an auxiliary display 150 for display of functions may be disposed at the second curved surface 124 of the bending section 120.

For example, when the display panel 100 includes the flat section 110 arranged at a central region of the display panel 100, and the bending section 120 arranged at an edge region of the display panel 100, a main display 160 for display of images may be disposed at the flat section 110, whereas the auxiliary display 150 for display of functions may be disposed at the bending section 120.

In this case, the auxiliary display 150 may display at least one of an electrical connection state between the display panel 100 and the support bar, an audio level state of speakers representing a plurality of frequency ranges, and an operation state of the display panel 100.

For example, the auxiliary display 150 may display function information 152 such as information as to the speakers and image information. If necessary, the auxiliary display 150 may include at least one sensor for sensing ambient brightness and, as such, may perform a mood lighting function for adjusting luminance in accordance with ambient brightness.

If necessary, the bending section 120 of the display panel 100 may also be provided with at least one connecting terminal for electrical connection of the display panel 100 to the support bar. In this case, the connecting terminal may be disposed at the back surface 100*b* of the display panel 100.

In addition, the bending section 120 of the display panel 100 may be provided with at least one connecting terminal for electrical connection between the display panel 100 and the support bar. The connecting terminal may be disposed at the back surface 100*b* of the display panel 100.

The bending section 120 of the display panel 100 may also be provided with a plurality of function buttons 153 for activation of functions of the display panel 100. The function buttons 153 may be disposed at the front surface 100*a* of the display panel 100.

Figure 4:
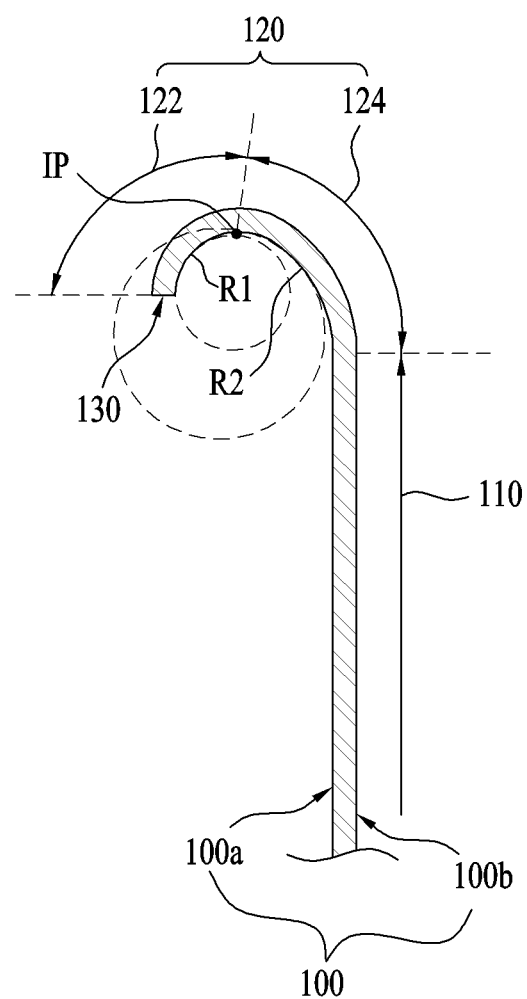
FIG. 4 is a sectional view illustrating a bending section in the display panel of FIG. 1 according to a second embodiment.

FIG. 4 is a sectional view illustrating a bending section in the display panel of FIG. 1 according to a second embodiment.

As illustrated in FIG. 4, the display panel 100 may include a flat section 110 having a flat surface, and a bending section 120 having a curved surface.

In this case, the flat section 110 of the display panel 100 may be arranged at a central region of the display panel 100, and the bending section 120 of the display panel 100 may be arranged at an edge region of the display panel 100.

In addition, the bending section 120 of the display panel 100 may include at least two curved surfaces forming at least one inflection point IP.

In this case, first and second curved surfaces 122 and 124 adjacent to each other at the inflection point IP may have different curvatures.

For example, when the bending section 120 of the display panel 100 is bent from a back surface 100*b* of the display panel 100 toward a front surface 100*a* of the display panel 100, the first curved surface 122 of the bending section 120 may be immediately adjacent to an end portion 130 of the display panel, and the second curved surface 24 of the bending section 120 may be adjacent to the first curved surface 122 while being spaced apart from the end portion 130 of the display panel 100.

In this case, the curvature of the first curved surface 122, namely, a curvature R1 may be greater than the curvature of the second curved surface 124, namely, a curvature R2.

When the curvature R1 of the first curved surface 122 is greater than the curvature R2 of the second curved surface 124, the first curved surface 122 of the bending section 120 may come into close contact with the support bar and, as such, the bending section 120 of the display panel 100 may be stably fastened to the support bar.

That is, since the display of the present invention is a wall-mounted display simply installable through hooking of the display panel 100 on the support bar, the bending section 120 of the display panel 100 should be stably in close contact with the support bar in order to prevent the display panel 100 from being separated from the support bar.

In addition, when the support bar of the present invention performs an additional function of the display, for example, a speaker function, the bending section 120 of the display panel 100 should be stably in close contact with the support bar in order to achieve contact between an electrical connecting terminal of the display panel 100 and an electrical connecting terminal of the support bar, for electrical connection between the display panel 100 and the support bar.

To this end, in the present invention, the curvature R1 of the first curved surface 122 in the bending section 120 may differ from the curvature R2 of the second curved surface 124 in the bending section 120 in order to achieve stable fastening of the bending section 120 in the display panel 100 to the support bar.

Figure 5:
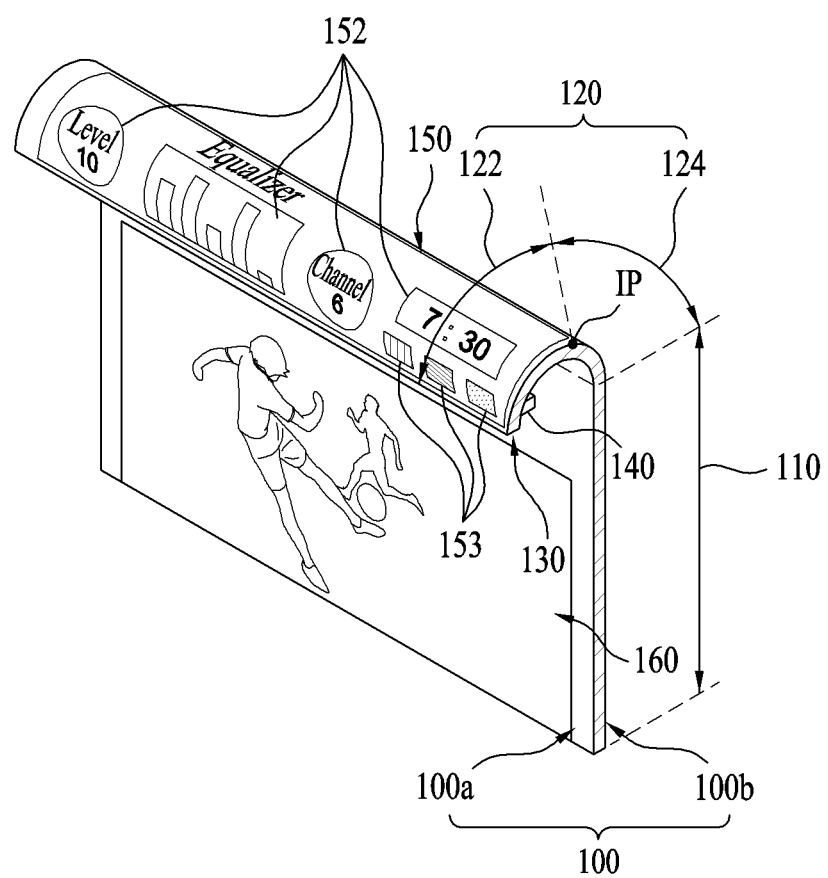
FIG. 5 is a view illustrating an auxiliary display disposed at the bending section of FIG. 4.

FIG. 5 is a view illustrating an auxiliary display disposed at the bending section of FIG. 4.

As illustrated in FIG. 5, the display panel 100 may include the flat section 110, which has a flat surface, and the bending section 120, which has a curved surface.

In this case, the flat section 110 of the display panel 100 may be arranged at a central region of the display panel 100, and the bending section 120 of the display panel 100 may be arranged at an edge region of the display panel 100.

In addition, the bending section 120 of the display panel 100 may include at least two curved surfaces forming at least one inflection point IP.

In this case, first and second curved surfaces 122 and 124 adjacent to each other at the inflection point IP may have different curvatures.

In this case, the first curved surface 122 of the bending section 120 may be a curved surface bent toward a front surface 100*a* of the display panel 100.

A fastening portion 140 to be fastened to the support bar may be provided at the first curved surface 122 of the bending section 120.

The fastening portion 140 provided at the first curved surface 122 may be a fastening protrusion protruding from an end of the front surface 100*a* of the display panel 100.

In addition, an auxiliary display 150 for display of functions may be disposed at the first curved surface 122 of the bending section 120.

For example, when the display panel 100 includes the flat section 110 arranged at a central region of the display panel 100, and the bending section 120 arranged at an edge region of the display panel 100, a main display 160 for display of images may be disposed at the flat section 110, whereas the auxiliary display 150 for display of functions may be disposed at the bending section 120.

In this case, the auxiliary display 150 may display at least one of an electrical connection state between the display panel 100 and the support bar, an audio level state of speakers representing a plurality of frequency ranges, and an operation state of the display panel 100.

For example, the auxiliary display 150 may display function information 152 such as information as to the speakers and image information.

If necessary, the auxiliary display 150 may include at least one sensor for sensing ambient brightness and, as such, may perform a mood lighting function for adjusting luminance in accordance with ambient brightness.

The bending section 120 of the display panel 100 may also be provided with at least one connecting terminal for electrical connection of the display panel 100 to the support bar. In this case, the connecting terminal may be disposed at the front surface 100*a* of the display panel 100.

In addition, the bending section 120 of the display panel 100 may be provided with a plurality of function buttons 153 for activation of functions of the display panel 100. The function buttons 153 may be disposed at the back surface 100b of the display panel 100.

Figure 6A:
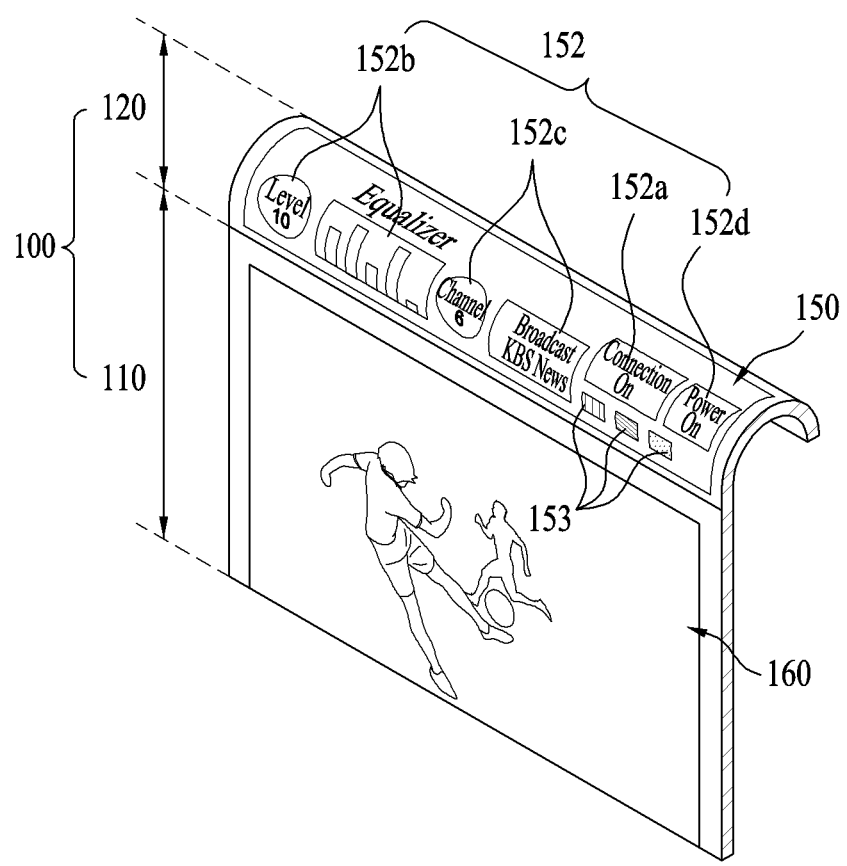
FIGS. 6A and 6B are views illustrating the auxiliary display of FIG. 3.
Figure 6B:
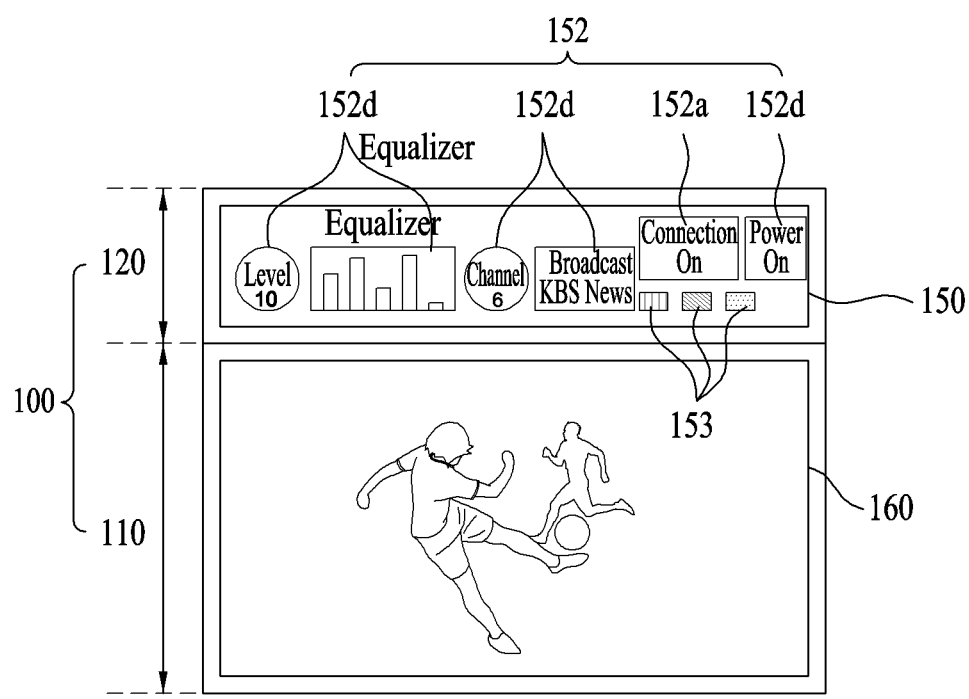

FIGS. 6A and 6B are views illustrating the auxiliary display of FIG. 3. FIG. 6A is a perspective view, and FIG. 6B is a front view.

As illustrated in FIGS. 6A and 6B, the display panel 100 may include the flat section 110, which has a flat surface, and the bending section 120, which has a curved surface.

In this case, the flat section 110 of the display panel 100 may be arranged at a central region of the display panel 100, and the bending section 120 of the display panel 100 may be arranged at an edge region of the display panel 100.

The main display 160 for display of images may be disposed at the flat section 110, whereas the auxiliary display 150 for display of functions may be disposed at the bending section 120.

In this case, the auxiliary display 150 may display the function information 152, which may include information 152a as to an electrical connection state between the display panel 100 and the support bar, information 152b as to an audio level state of speakers representing a plurality of frequency ranges, and information 152d as to an operation state of the display panel 100.

In addition, the bending section 120 of the display panel 100 may be provided with the plurality of function buttons 153 for activation of functions of the display panel 100. The function buttons 153 may be touch buttons.

Thus, in the present invention, the bending section for fastening of the panel may be used as an auxiliary display for display of various functions.

Figure 7A:
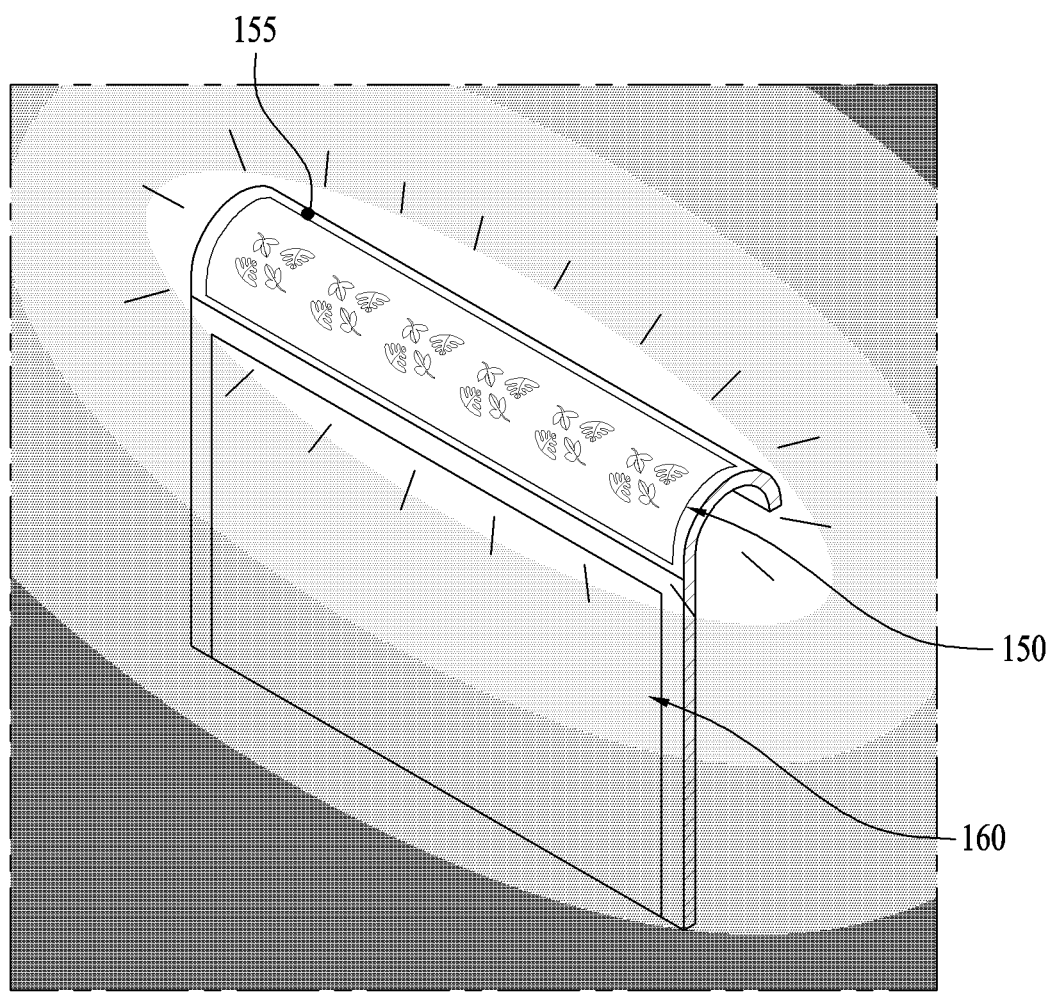
FIG. 7 is a view illustrating an auxiliary display having a mood lighting function.
Figure 7B:
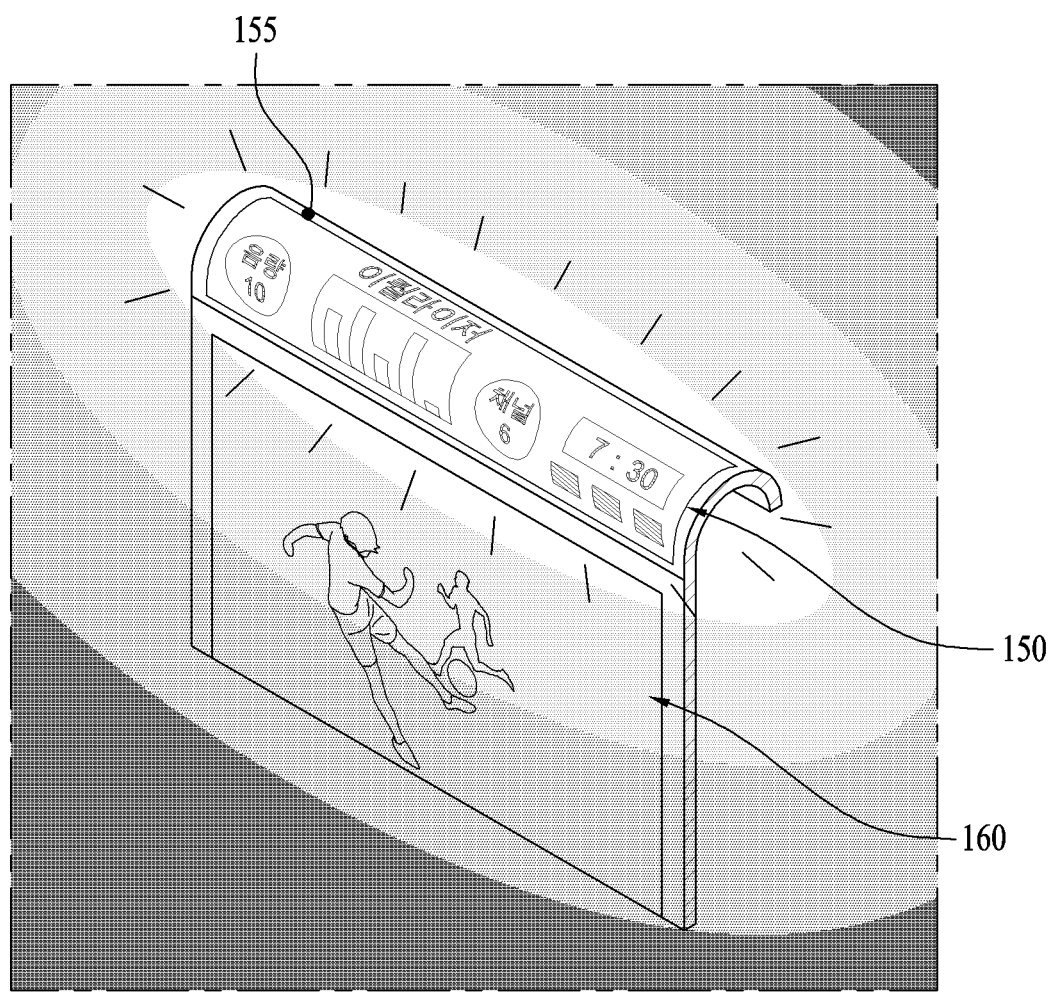

FIG. 7 is a view illustrating an auxiliary display having a mood lighting function.

As illustrated in FIG. 7, a main display 160 for display of images may be disposed at a flat section 110, whereas an auxiliary display 150 for display of functions may be disposed at a bending section 120.

The auxiliary display 150 may include at least one sensor for sensing ambient brightness.

In this case, the auxiliary display 150 may perform a mood lighting function for adjusting luminance in accordance with ambient brightness sensed by the sensor 155.

In this case, whether or not the mood lighting function should be activated may be set by the user.

Meanwhile, the auxiliary display 150 may perform the mood lighting function, only when operation of the main display 160 is in an OFF state.

In this case, unnecessary waste of electricity may be avoided.

If necessary, the main display 160 may adjust luminance thereof in accordance with ambient brightness sensed through the sensor 155 of the auxiliary display 150 and, as such, may provide an image having optimal luminance to the user.

Figure 8:
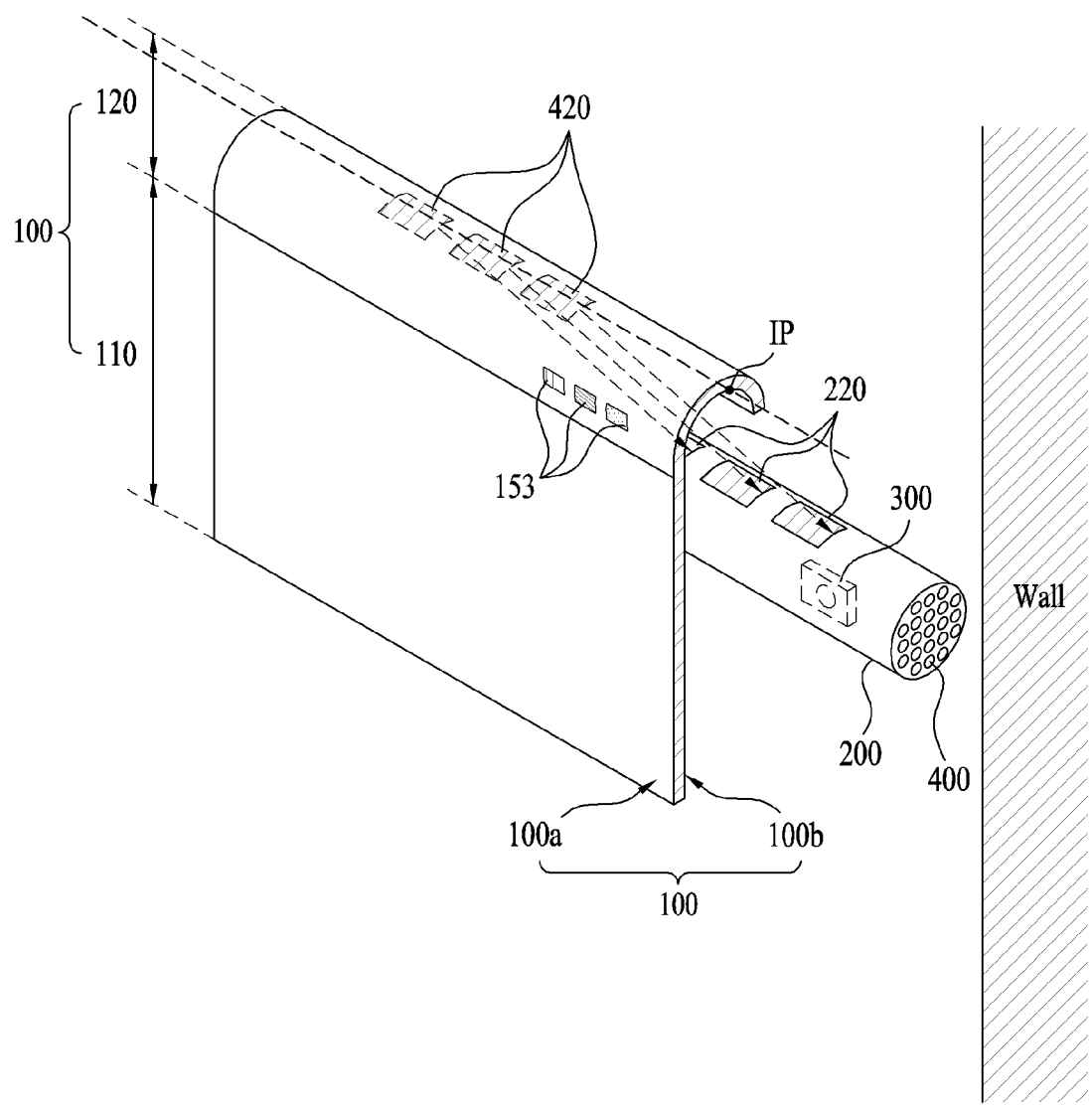
FIG. 8 is a view illustrating electrical connection between the display panel and the support bar.

FIG. 8 is a view illustrating electrical connection between the display panel and the support bar.

As illustrated in FIG. 8, the display panel 100 may include a flat section 110 having a flat surface, and a bending section 120 having a curved surface.

In this case, the flat section 110 of the display panel 100 may be arranged at a central region of the display panel 100, and the bending section 120 of the display panel 100 may be arranged at an edge region of the display panel 100.

In addition, the bending section 120 of the display panel 100 may include at least two curved surfaces forming at least one inflection point IP.

In this case, first and second curved surfaces adjacent to each other at the inflection point IP may have different curvatures.

The bending section 120 of the display panel 100 may also be provided with at least one connecting terminal 420 for electrical connection of the display panel 100 to the support bar 200. In this case, the connecting terminal 420 may be disposed at a rear surface 100b of the display panel 100.

In addition, the bending section 120 of the display panel 100 may be provided with a plurality of function buttons 153 for activation of functions of the display panel 100. The function buttons 153 may be disposed at a front surface 100a of the display panel 100.

Meanwhile, the support bar 200 may be fixed to a wall by the bracket 300.

In this case, the support bar 200 may include speakers 400 for outputting an audio signal from the display panel 100.

In addition, the support bar 200 may include at least one connecting terminal 220 for electrical connection of the speakers 400 to the display panel 100.

The support bar 200 may come into contact with the bending section 120 of the display panel 120 and, as such, may support the display panel 100.

In this case, electrical connecting terminals 220 of the support bar 200 may electrically contact corresponding ones of electrical connecting terminals 420 of the display panel 100, respectively.

The connecting terminals 420 of the display panel 100 may be arranged along lines forming the inflection point IP and, as such, the bending section 120 of the display panel 100 may stably contact the support bar 200 in order to make the electrical connecting terminals 420 electrically contact the electrical connecting terminals of the support bar 200, respectively.

Figure 9C:
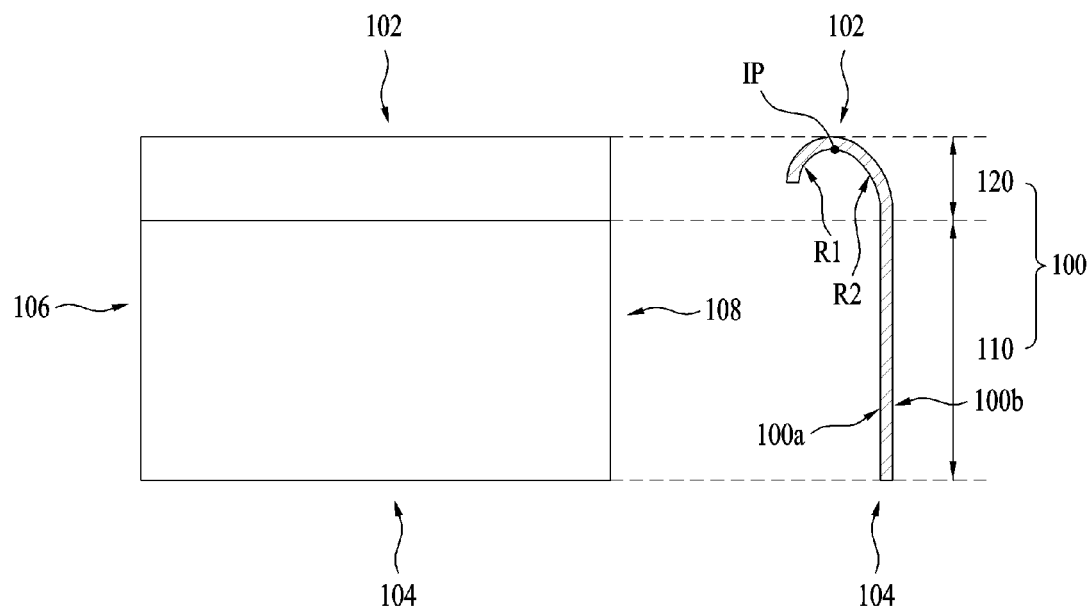
Figure 9D:
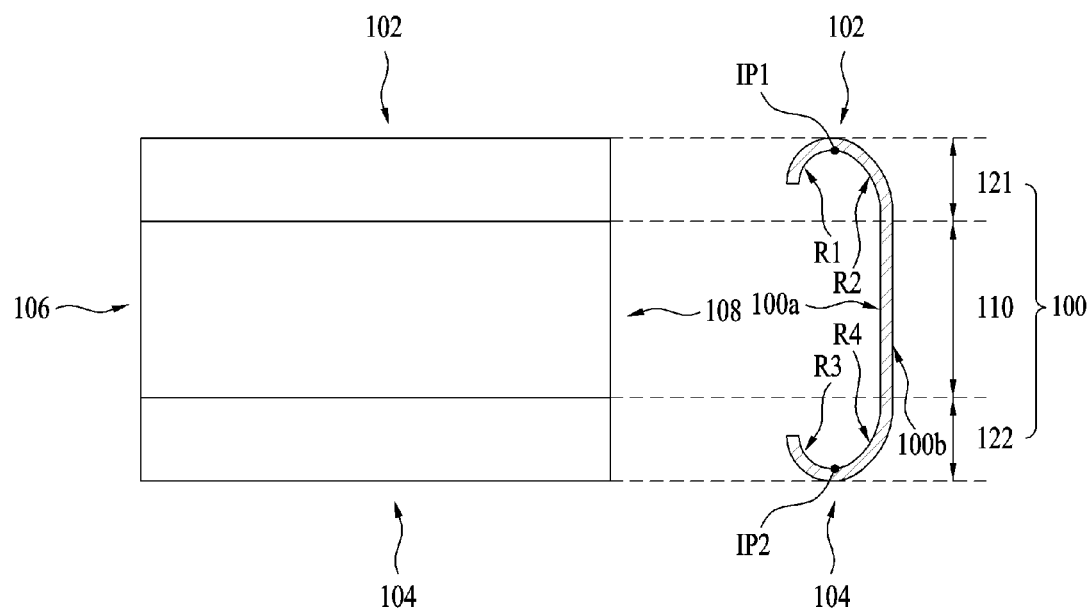

FIGS. 9A to 9D are views illustrating positions of bending sections of display panels, respectively. FIG. 9A illustrates a display panel having a bending section bent backwards. FIG. 9B illustrates a display panel having a plurality of bending sections bent backwards. FIG. 9C illustrates a display panel having a bending section bent forwards. FIG. 9D illustrates a display panel having a plurality of bending sections bent forwards.

As illustrated in each of FIGS. 9A to 9D, the illustrated display panel 100 may include a flat section 110 having a flat surface, and a bending section 120 having a curved surface.

In this case, the flat section 110 of the display panel 100 may be arranged at a central region of the display panel 100, and the bending section 120 of the display panel 100 may be arranged at an edge region of the display panel 100.

For example, the edge region of the display panel 100 may include left and right edge regions 106 and 108 opposite to each other, and upper and lower edge regions 102 and 104 opposite to each other.

The bending section 120 may be arranged at at least one of the upper and lower edge regions 102 and 104.

The display panel 100 may have a flat surface at the entire region thereof, except for the bending section 120.

In addition, the bending section 120 of the display panel 100 may include at least two curved surfaces forming at least one inflection point IP.

In this case, first and second curved surfaces adjacent to each other at the inflection point IP may have different curvatures.

For example, as illustrated in FIG. 9A, one bending section 120 may be arranged at the upper edge region 102 of the display panel 100, and may be bent toward the back surface 100b of the display panel 100. In this case, the first and second curved surfaces, which are adjacent to each other at the inflection point IP, may have different curvatures R1 and R2, respectively.

In another example, as illustrated in FIG. 9B, a first bending section 121 may be arranged at the upper edge region 102 of the display panel 100, and a second bending section 122 may be arranged at the lower edge region 102 of the display panel 100. The first and second bending sections 121 and 122 may be bent toward the back surface 100b of the display panel 100. In this case, first and second curved surfaces, which are adjacent to each other at a first inflection point IP1, may have different curvatures R1 and R2, respectively, and third and fourth curved surfaces, which are adjacent to each other at a second inflection point IP2, may have different curvatures R3 and R4, respectively.

In another example, as illustrated in FIG. 9C, one bending section 120 may be arranged at the upper edge region 102 of the display panel 100, and may be bent toward the front surface 100a of the display panel 100. In this case, the first and second curved surfaces, which are adjacent to each other at the inflection point IP, may have different curvatures R1 and R2, respectively.

In another example, as illustrated in FIG. 9D, a first bending section 121 may be arranged at the upper edge region 102 of the display panel 100, and a second bending section 122 may be arranged at the lower edge region 102 of the display panel 100. The first and second bending sections 121 and 122 may be bent toward the front surface 100a of the display panel 100. In this case, first and second curved surfaces, which are adjacent to each other at a first inflection point IP1, may have different curvatures R1 and R2, respectively, and third and fourth curved surfaces, which are adjacent to each other at a second inflection point IP2, may have different curvatures R3 and R4, respectively.

When the display panel 100 includes a plurality of bending sections 120, a plurality of support bars to fasten the display panel 100 is provided and, as such, the wall-mounted flexible display may be stably mounted to a wall.

Figure 10A:
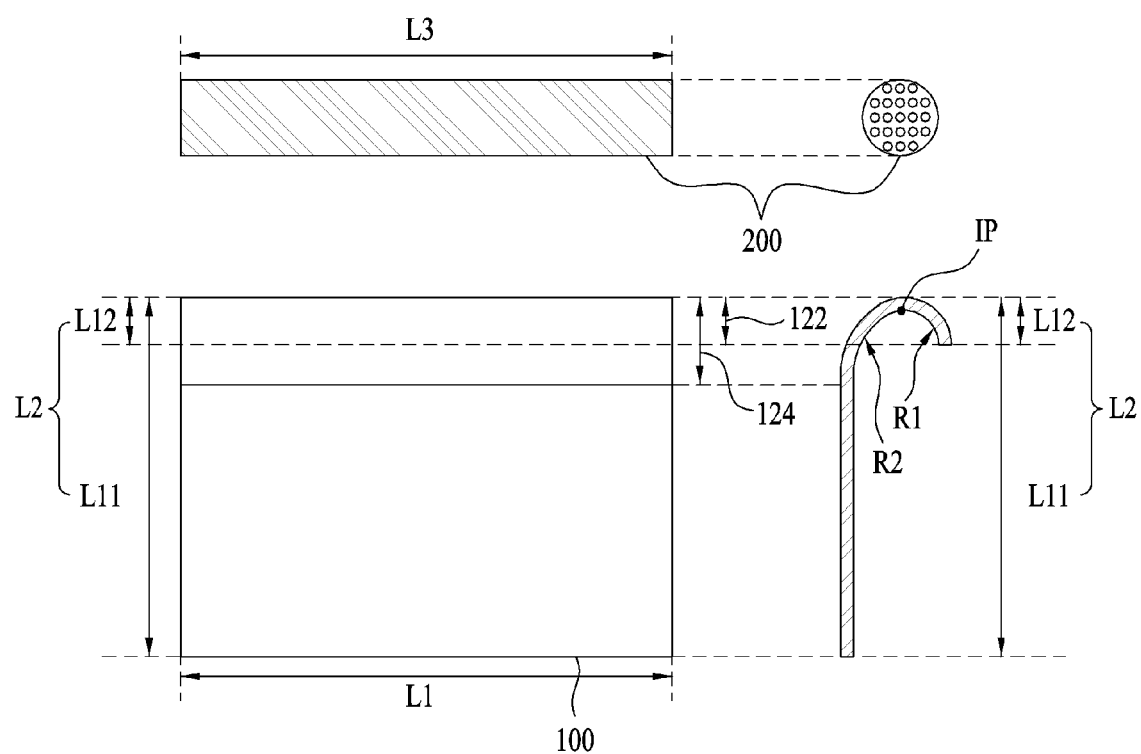
FIGS. 10A and 10B illustrate an embodiment associated with support bar length.
Figure 10B:
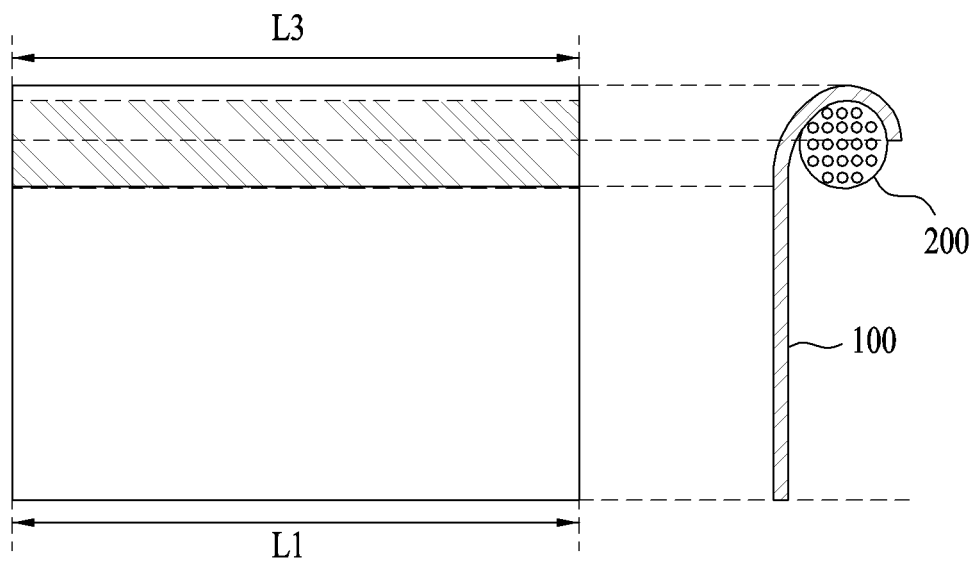

FIGS. 10A and 10B illustrate an embodiment associated with support bar length. FIG. 10A is a view illustrating a state before the display panel is fastened to the support bar. FIG. 10B is a view illustrating a state after the display panel is fastened to the support bar.

As illustrated in FIGS. 10A and 10B, the display panel 100 has a horizontal length L1 and a vertical length L2. The horizontal length L1 may be greater than the vertical length L2.

In this case, the vertical length L2 may be a sum of a length L11 from a lower end of the display panel 100 to a horizontal line, on which the inflection point IP of the bending section is located, and a length L12 from the horizontal line, on which the inflection point IP of the bending section is located, to an upper end of the display panel 100.

In addition, the length of the support bar 200, namely, a length L3, may be equal to the horizontal length L1 of the display panel 100.

When the length L3 of the support bar 200 is equal to the horizontal length L1 of the display panel 100, as described above, appearance of the flexible display mounted to a wall may be refined.

Figure 11A:
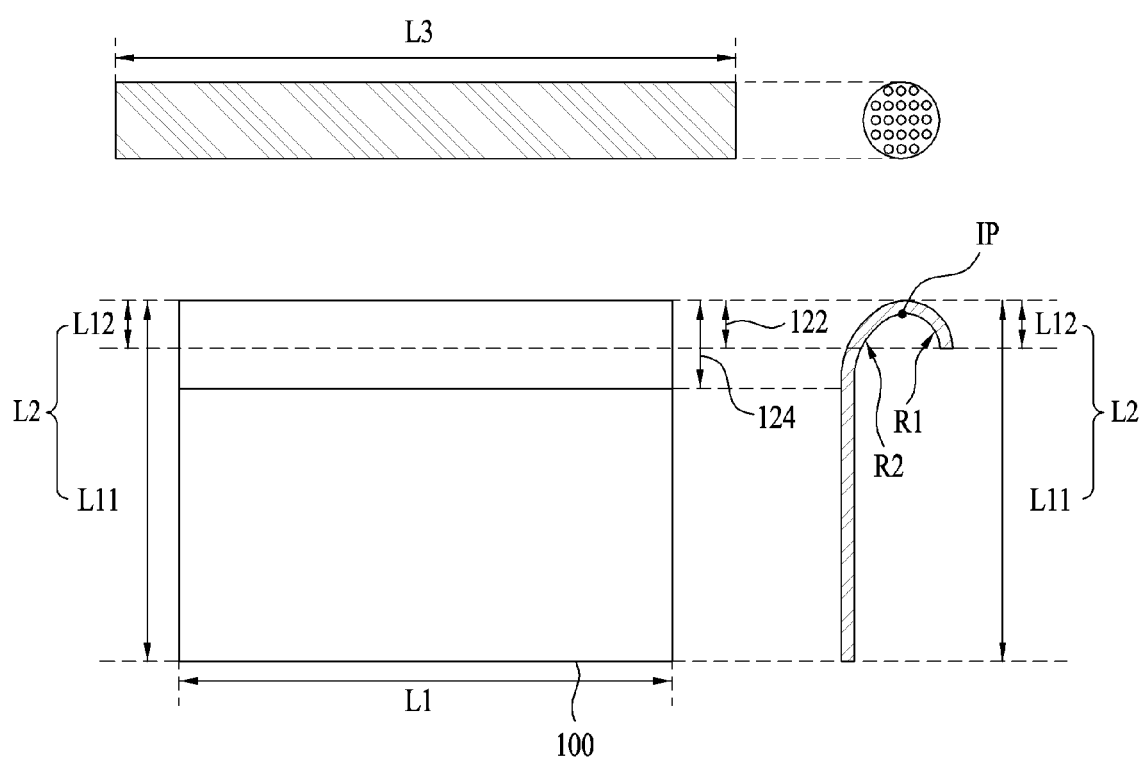
FIGS. 11A and 11B illustrate another embodiment associated with support bar length.
Figure 11B:
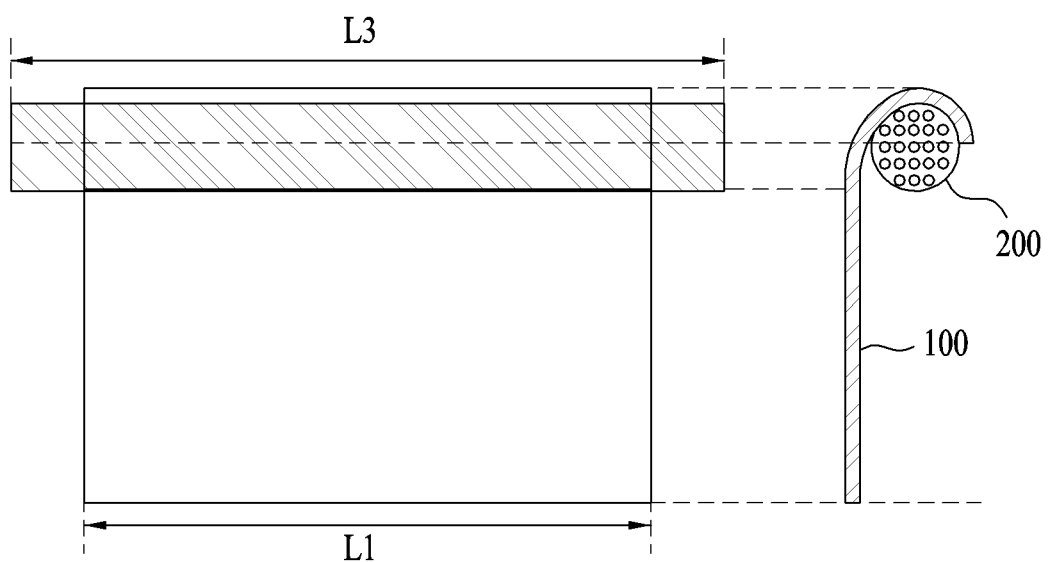

FIGS. 11A and 11B illustrate another embodiment associated with support bar length. FIG. 11A is a view illustrating a state before the display panel is fastened to the support bar. FIG. 11B is a view illustrating a state after the display panel is fastened to the support bar.

As illustrated in FIGS. 11A and 11B, the display panel 100 has a horizontal length L1 and a vertical length L2. The horizontal length L1 may be greater than the vertical length L2.

In this case, the vertical length L2 may be a sum of a length L11 from a lower end of the display panel 100 to a horizontal line, on which the inflection point IP of the bending section is located, and a length L12 from the horizontal line, on which the inflection point IP of the bending section is located, to an upper end of the display panel 100.

In addition, the length of the support bar 200, namely, a length L3, may be greater than the horizontal length L1 of the display panel 100.

When the length L3 of the support bar 200 is greater than the horizontal length L1 of the display panel 100, as described above, the support bar 200 may stably support the display panel 100 and, as such, the flexible display may be stably mounted to a wall.

If necessary, the speakers may be arranged at opposite lateral ends of the support bar 200, which are exposed from the display panel 100.

In this case, an enhancement in audio quality of the flexible display may be achieved because the speakers are exposed outwards.

Figure 12A:
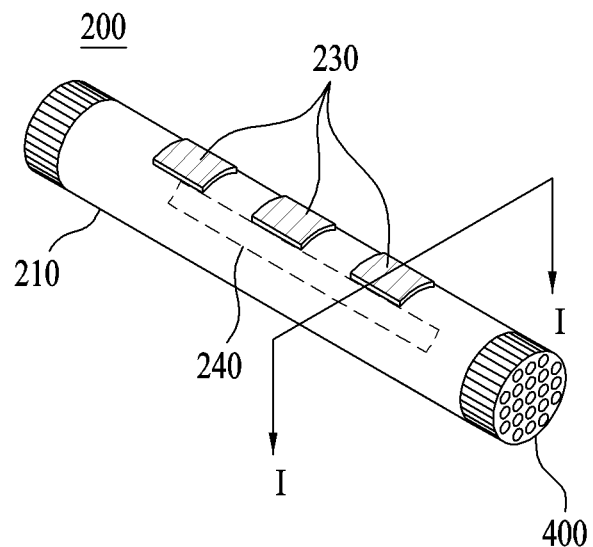
FIGS. 12A to 12C are views illustrating the support bar.
Figure 12B:
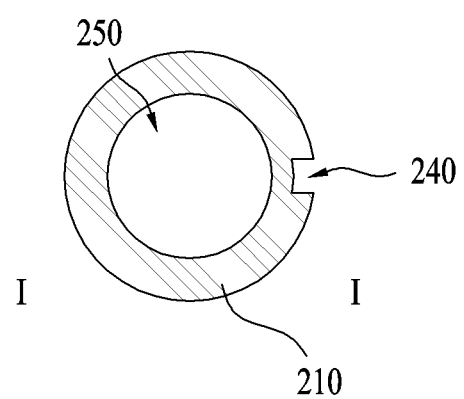
Figure 12C:
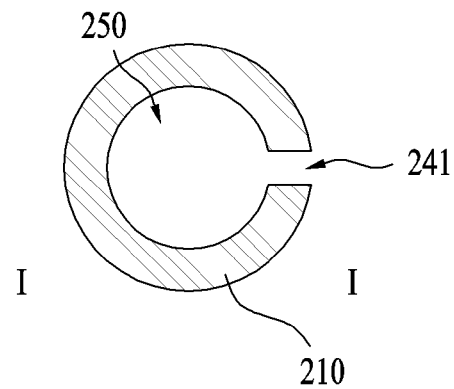

FIGS. 12A to 12C are views illustrating the support bar. FIG. 12A is a perspective view illustrating a structure of the support bar. FIGS. 12B and 12C are cross-sectional views taken along line I-I in FIG. 12A.

As illustrated in FIGS. 12A to 12C, the support bar 200 may include a body 210, speakers 400, a connecting terminal 230, and a fastening groove 240.

The body 210 may contact the bending section of the display panel, to support the display panel.

In this case, the body 210 may have a curved surface at a region thereof contacting the bending section of the display panel. The curvature of the curved surface of the body 210 may be equal to the curvature of the first curved surface of the bending section or the curvature of the second curved surface of the bending section.

If necessary, the body 210 may have a curved surface and a flat surface. In this case, the curved surface may be formed at the region contacting the bending section of the display panel, and the flat surface may be formed at a region not contacting the bending section of the display panel.

Meanwhile, the speakers 400 may be arranged at certain regions of the body 210, to output an audio signal from the display panel.

In this case, the speakers 400 may be arranged at opposite lateral ends of the body 210, which are exposed from the display panel. Alternatively, the speakers 400 may be arranged at a central region of the body 210 not exposed from the display panel.

The connecting terminal 230 is arranged at a certain region of the body 210, to electrically connect the speakers 400 to the display panel. One connecting terminal 230 or a plurality of connecting terminals 230 may be provided.

The connecting terminals 230 of the support bar 200 may be arranged on a horizontal line, on which the inflection point is located. In this case, it may be possible to surely achieve electrical contact between the connecting terminals 230 of the support bar 200 and the connecting terminals of the display panel because the region, on which the inflection point is located, is a region where the support bar 200 most effectively comes into close contact with the display panel, as compared to other regions of the support bar 200.

Meanwhile, as illustrated in FIG. 12B, the fastening groove 240 may be arranged at the body 210 of the support bar 200, to fasten the bending section of the display panel to the support bar 200.

In this case, the fastening groove 240 of the support bar 200 may be engaged with the fastening protrusion disposed at the end of the bending section of the display panel.

If necessary, as illustrated in FIG. 12C, a fastening hole 241 may be provided at the body 210 of the support bar 200, to fasten the bending section of the display panel to the support bar 210.

In this case, the fastening hole 241 of the support bar 200 may be engaged with the fastening protrusion disposed at the end of the bending section of the display panel.

Meanwhile, the body 210 of the support bar 200 may have a hollow portion 250. In this case, the speaker driver to drive the speakers 400 and the power supply to supply electric power to the speaker driver and speakers 400 may be received in the body 210 of the support bar 200.

Figure 13A:
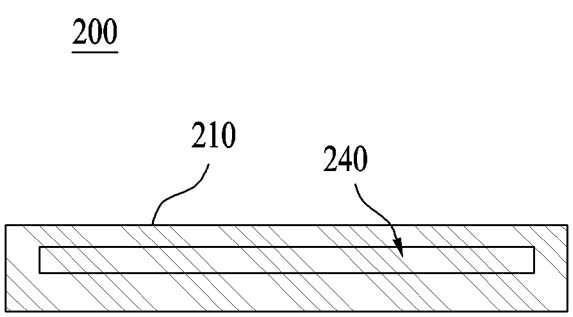
FIGS. 13A and 13B are views illustrating fastening portions of support bars, respectively.
Figure 13B:
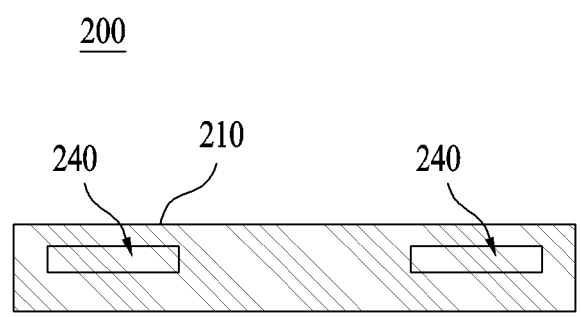

FIGS. 13A and 13B are views illustrating fastening portions of support bars, respectively. FIG. 13A is a view illustrating a support bar having one fastening portion. FIG. 13B is a view illustrating a support bar having a plurality of fastening portions.

As illustrated in FIGS. 13A and 13B, the body 210 of the support bar 200 may be provided with a fastening portion for fastening of the bending section of the display panel to the support bar 200.

In this case, the fastening portion of the support bar 200 may be a fastening groove 240. The fastening groove 240 may be engaged with the fastening protrusion disposed at the end of the bending section of the display panel.

As illustrated in FIG. 13A, one fastening groove 240, which has a stripe shape extending from one end of the body 210 to the other end of the body 210, may be provided. Alternatively, stripe-shaped fastening grooves 240 may be arranged at opposite sides of the body 210, respectively, as illustrated in FIG. 13B.

In this case, the number of fastening grooves 240 may be equal to the number of fastening protrusions provided at the bending section of the display panel.

Figure 14A:
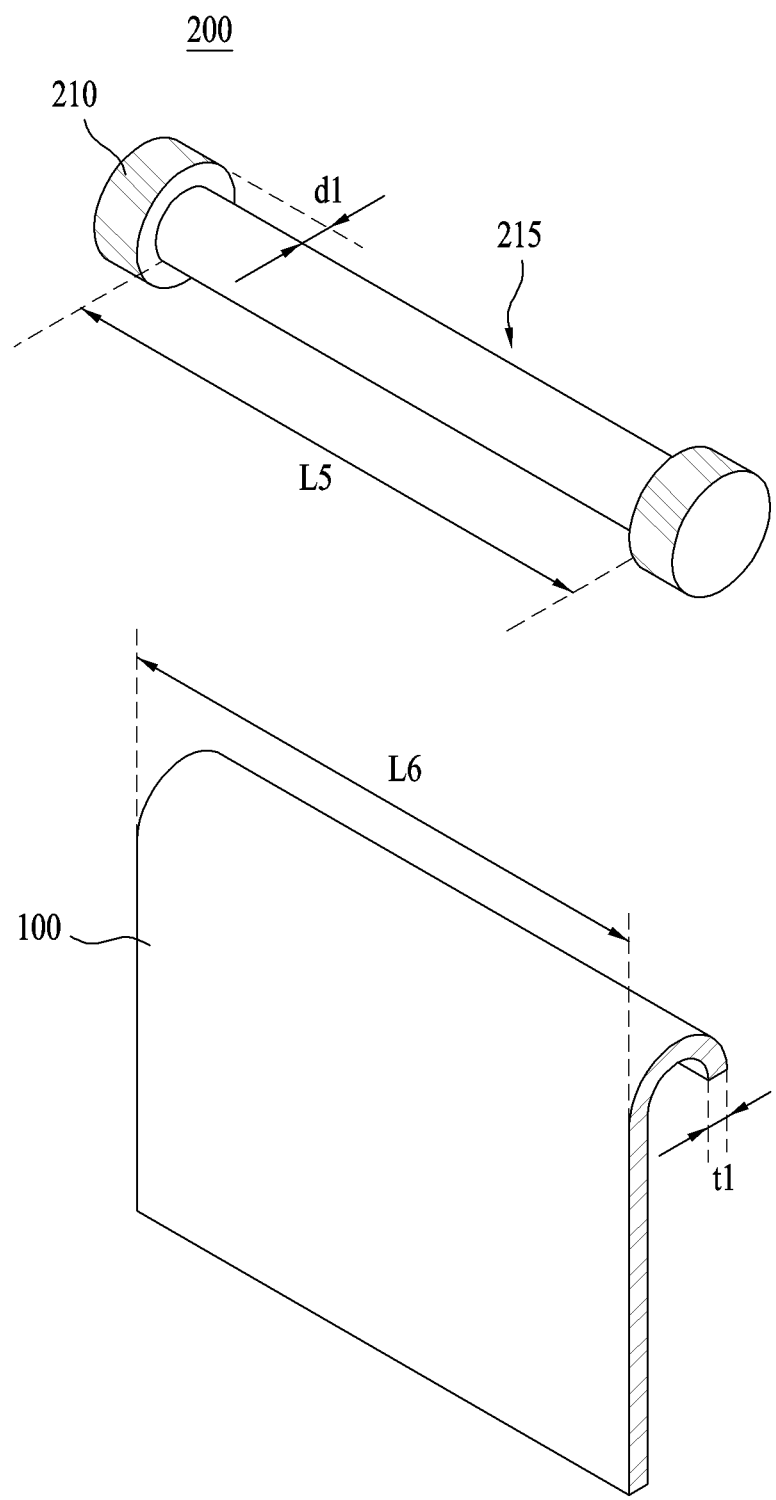
FIGS. 14A to 14C are views illustrating a guide groove of the support bar.
Figure 14B:
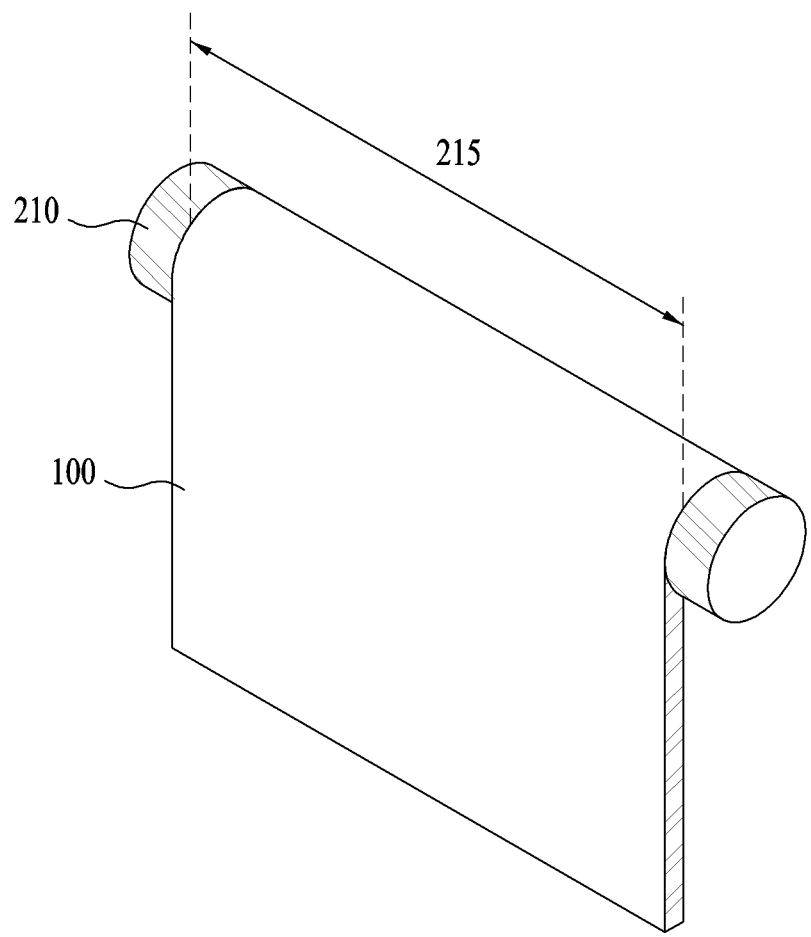
Figure 14C:
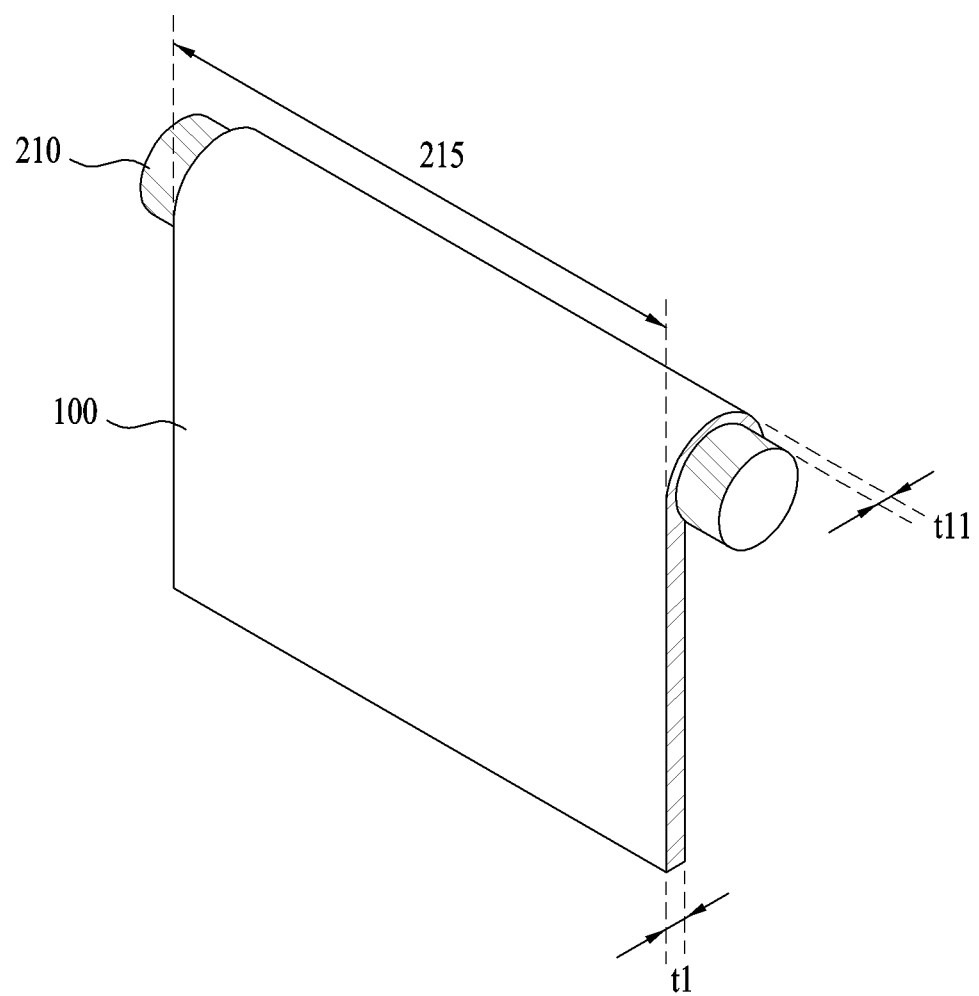

FIGS. 14A to 14C are views illustrating a guide groove of the support bar. FIG. 14A is a view illustrating a state before the display panel is fastened to the guide groove of the support bar. FIGS. 14B and 14C are views each illustrating a state after the display panel is fastened to the guide groove of the support bar.

As illustrated in FIG. 14A, the body 210 of the support bar 200 may be provided with a guide groove 215 to contact the bending section of the display panel.

In this case, as illustrated in FIG. 14B, the depth of the guide groove 215 in the body 210, namely, a depth dl, may be equal to the thickness of the display panel 100, namely, a thickness t1.

If necessary, as illustrated in FIG. 14C, the depth dl of the guide groove 215 in the body 210 may differ from the thickness t1 of the display panel 100. For example, the depth dl of the guide groove 215 in the body 210 may be smaller than the thickness t1 of the display panel 100.

In this case, the display panel 100 may protrude, by a thickness t11, from the body 210 at a portion thereof disposed at the guide groove 215.

Meanwhile, the length of the guide groove 215 in the body section 210, namely, a length L5, may be equal to the horizontal length of the display panel 100, namely, a horizontal length L6.

When the guide groove 215 is provided at the body 210 of the support bar 200, the display panel 100 may be stably fastened to the support bar 200.

That is, the guide groove 215 of the support bar 200 prevents movement of the display panel 100 and, as such, the display panel 100 may be stably fastened.

The guide groove 215 of the support bar 200 may also prevent the edge region of the display panel 100 from being damaged by external impact.

Figure 15:
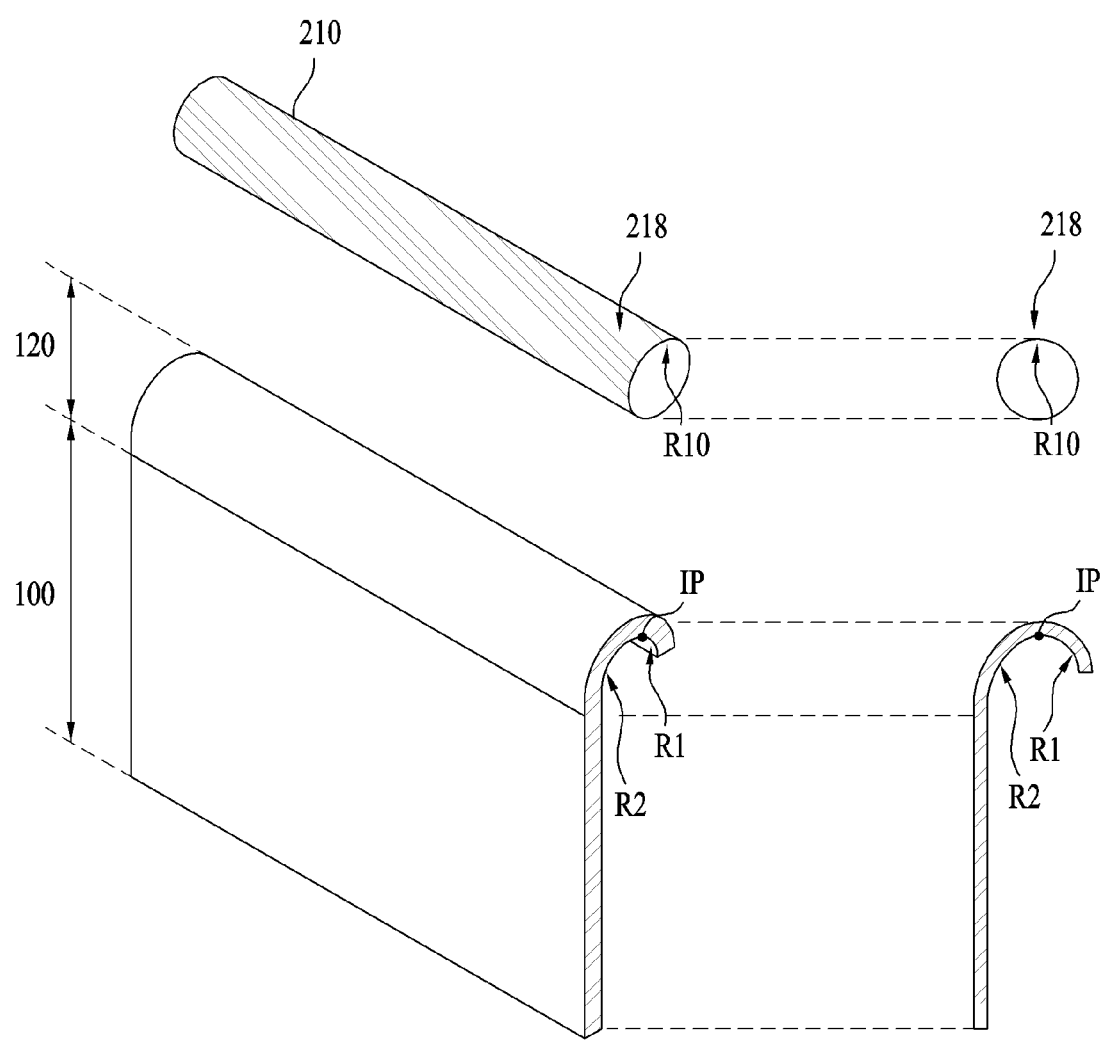
FIG. 15 illustrates an embodiment associated with curvature of the support bar.

FIG. 15 illustrates an embodiment associated with curvature of the support bar.

As illustrated in FIG. 15, the body 210 of the support bar may contact the bending section 120 of the display panel 100, thereby supporting the display panel 100.

In this case, the body 210 has a curved surface 218 at a region thereof contacting the bending section 120 of the display panel 100. The curvature of the curved surface 218 in the body 210, namely, a curvature R10, may be equal to the curvature R1 of the first curved surface in the bending section 120 or the curvature R2 of the second curved surface in the bending section 120.

When the curvature R10 of the curved surface 218 in the body 210 is equal to the curvature R1 of the first curved surface in the bending section 120 or the curvature R2 of the second curved surface in the bending section 120, the first curved surface or second curved surface of the bending section 120 may come into close contact with the body 210 of the support bar and, as such, the display panel 100 may be stably fastened to the body 210 of the support bar.

Accordingly, it may be possible to achieve stable electrical contact between the display panel and the support bar by providing curved surfaces having the same curvature at the bending section 120 of the display panel 100 and the body 210 of the support bar, respectively, and arranging connecting terminals at the curved surfaces.

Figure 16:
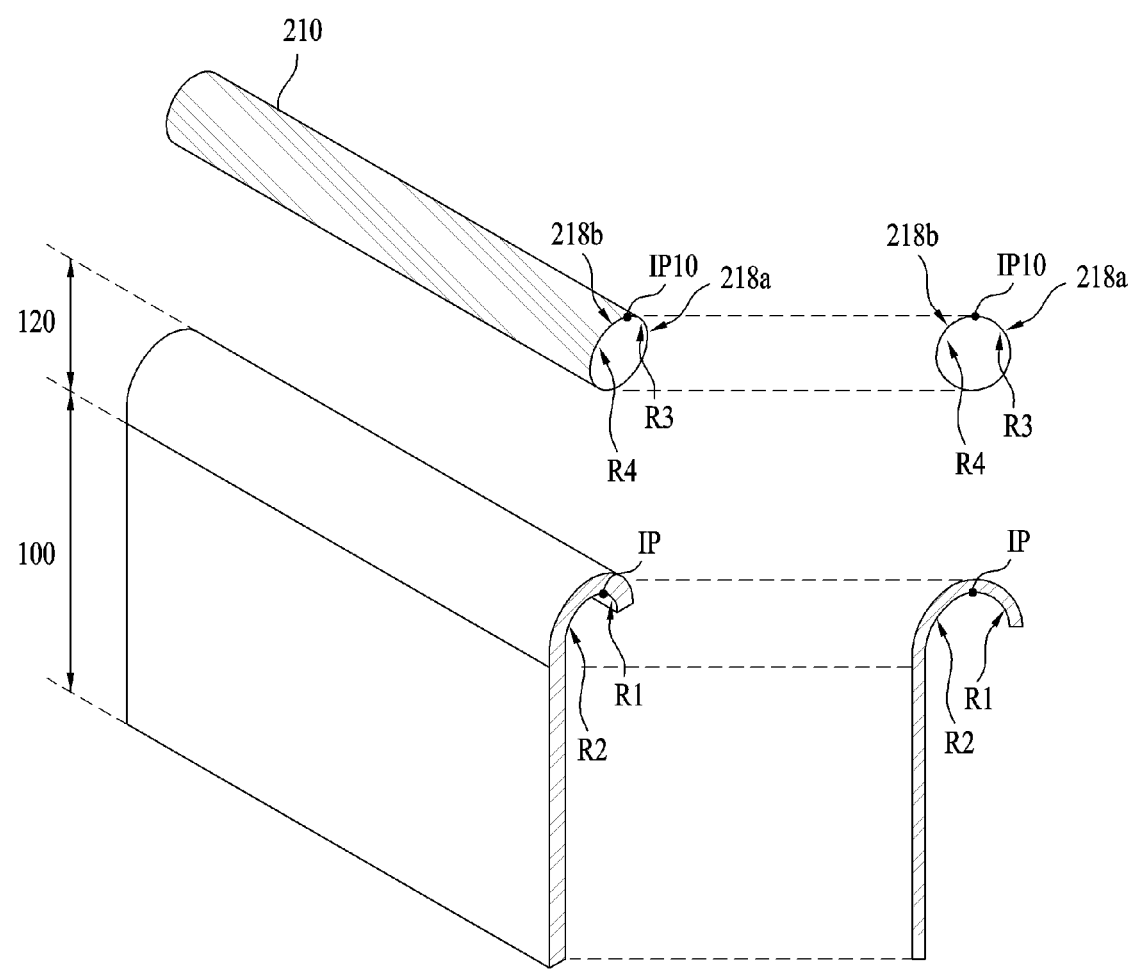
FIG. 16 illustrates another embodiment associated with curvature of the support bar.

FIG. 16 illustrates another embodiment associated with curvature of the support bar.

As illustrated in FIG. 16, the body 210 of the support bar may contact the bending section 120 of the display panel 100, thereby supporting the display panel 100.

In this case, the body 210 has a curved surface at a region thereof contacting the bending section 120 of the display panel 100.

The curved surface of the body 210 may include third and fourth curved surfaces 218a and 218b adjacent to each other at an inflection point IP10. The third and fourth curved surfaces 218a and 218b may have different curvatures R3 and R4, respectively.

The third curved surface 218a may correspond to the first curved surface of the bending section 120 of the display panel 100. The fourth curved surface 218b may correspond to the second curved surface of the bending section 120 of the display panel 100.

The curvature R3 of the third curved surface 218a of the body 210 may be equal to the curvature R1 of the first curved surface of the bending section 210. The curvature R4 of the third curved surface 218b of the body 210 may be equal to the curvature R2 of the second curved surface of the bending section 210.

When the curvature R3 of the third curved surface 218a in the body 210 is equal to the curvature R1 of the first curved surface in the bending section 120, and the curvature R4 of the fourth curved surface 218b in the bending section 120120 is equal to the curvature R2 of the second curved surface in the bending section 120, the first curved surface and second curved surface of the bending section 120 may completely come into close contact with the body 210 of the support bar and, as such, the display panel 100 may be stably fastened to the body 210 of the support bar.

Accordingly, it may be possible to achieve stable electrical contact between the display panel and the support bar by providing curved surfaces having the same curvature at the bending section 120 of the display panel 100 and the body 210 of the support bar, respectively, and arranging connecting terminals at the curved surfaces.

Figure 17:
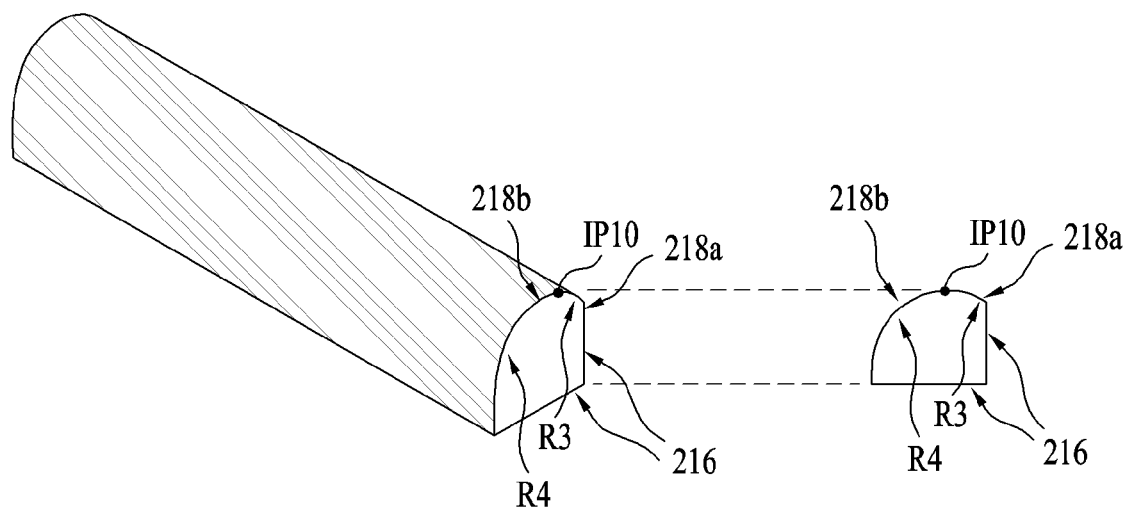
FIG. 17 illustrates another embodiment associated with curvature of the support bar.

FIG. 17 illustrates another embodiment associated with curvature of the support bar.

As illustrated in FIG. 17, the body 210 of the support bar may contact the bending section 120 of the display panel 100, thereby supporting the display panel 100.

In this case, the body 210 has a curved surface at a region thereof contacting the bending section 120 of the display panel 100 while having a flat surface 216 at a region thereof not contacting the bending section 120 of the display panel 100.

The curved surface of the body 210 may include third and fourth curved surfaces 218a and 218b adjacent to each other at an inflection point IP10. The third and fourth curved surfaces 218a and 218b may have different curvatures R3 and R4, respectively.

The third curved surface 218a may correspond to the first curved surface of the bending section 120 of the display panel 100. The fourth curved surface 218b may correspond to the second curved surface of the bending section 120 of the display panel 100.

The curvature R3 of the third curved surface 218a of the body 210 may be equal to the curvature R1 of the first curved surface of the bending section 210. The curvature R4 of the third curved surface 218b of the body 210 may be equal to the curvature R2 of the second curved surface of the bending section 210.

When the curvature R3 of the third curved surface 218a in the body 210 is equal to the curvature R1 of the first curved surface in the bending section 120, and the curvature R4 of the fourth curved surface 218b in the bending section 120 is equal to the curvature R2 of the second curved surface in the bending section 120, the first curved surface and second curved surface of the bending section 120 may completely come into close contact with the body 210 of the support bar and, as such, the display panel 100 may be stably fastened to the body 210 of the support bar.

Accordingly, it may be possible to achieve stable electrical contact between the display panel and the support bar by providing curved surfaces having the same curvature at the bending section 120 of the display panel 100 and the body 210 of the support bar, respectively, and arranging connecting terminals at the curved surfaces.

When the body 210 includes the flat surface 216 at the region not contacting the bending section 120 of the display panel 100, as described above, it may be possible to achieve easy installation of the support bar because, when the body 210 of the support bar is fixed to a wall, using the bracket, the body 210 of the support bar may stably come into close contact with the wall.

Figure 18A:
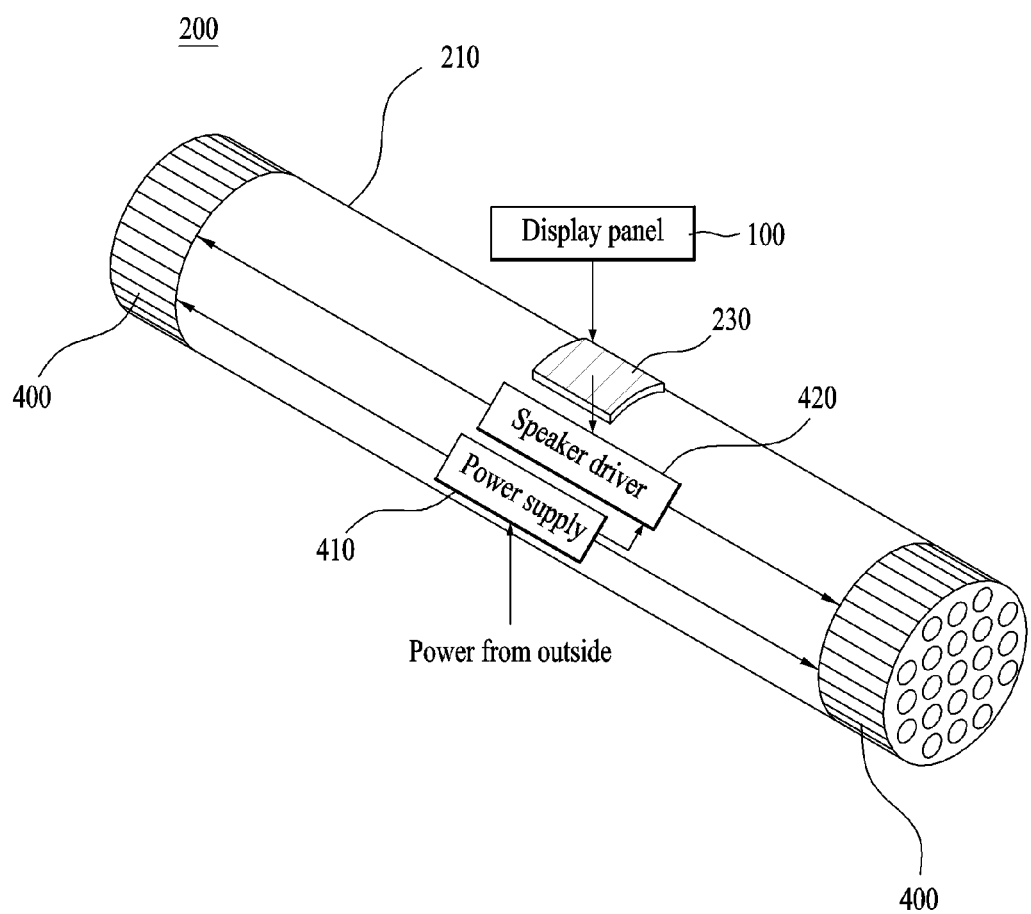
FIGS. 18A and 18B are views illustrating support bars each having a single body.
Figure 18B:
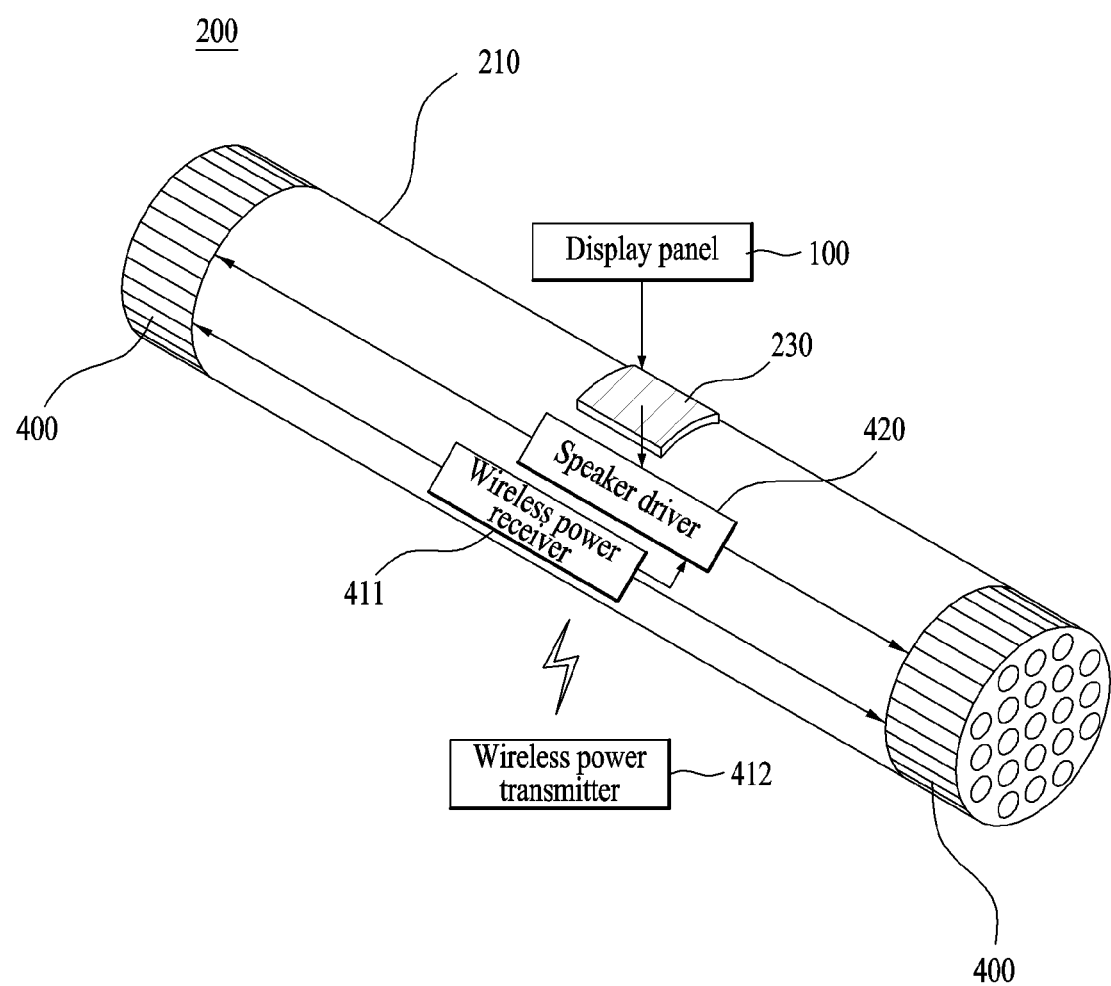

FIGS. 18A and 18B are views illustrating support bars each having a single body. FIG. 18A is a view illustrating a support bar having a wired power supply. FIG. 18B is a view illustrating a support bar having a wireless power supply.

As illustrated in each of FIGS. 18A and 18B, the illustrated support bar 200 may include a body 210, speakers 400, and a connecting terminal 230.

In this case, the body 210 may contact the bending section of the display panel, thereby supporting the display panel.

Meanwhile, the speakers 400 may be arranged at certain regions of the body 210, to output an audio signal from the display panel.

In this case, the speakers 400 may be arranged at opposite lateral ends of the body 210, which are exposed from the display panel. Alternatively, the speakers 400 may be arranged at a central region of the body 210 not exposed from the display panel.

The connecting terminal 230 is arranged at a certain region of the body 210, to electrically connect the speakers 400 to the display panel. One connecting terminal 230 or a plurality of connecting terminals 230 may be provided.

For example, as illustrated in FIG. 18A, the body 210 may include a speaker driver 420 for driving the speakers 400, and a power supply 410 for supplying electric power to the speaker driver and the speakers 400.

Accordingly, when the speaker driver 420 receives an audio signal output from the display panel 100, the speaker driver 420 may drive the speakers 400, thereby outputting the audio signal from the display panel 100.

Meanwhile, when the power supply 410 receives electric power from the outside in a wired manner, the power supply 410 may apply the received electric power to the speakers 400 and speaker driver 420.

In this case, lines connected to the power supply 410 may be arranged in an empty space between the display panel 100 and the wall and, as such, appearance of the flexible display mounted to the wall may be simple yet refined, and space utility may be enhanced.

If necessary, the wired power supply may be replaced by a wireless power supply, as illustrated in FIG. 18B.

For example, the body 210 of the support bar 200 may include a wireless power receiver 411.

The wireless power receiver 411 may receive electric power from an external wireless power transmitter 412, and may transmit the received electric power to the speakers 400 and speaker driver 420.

In this case, the wireless power receiver 411 and wireless power transmitter 412 should be spaced apart from each other by a predetermined distance. Furthermore, adverse affects may be generated in association with supply of electric power in accordance with environmental conditions. To this end, a power storage device may be additionally disposed in the body 210 of the support bar 200.

That is, the power storage device stores electric power to a predetermined capacity, irrespective of whether or not the flexible display is driven, and, as such, electric power stored in the power storage device may be used when supply of electric power from the wireless power transmitter 412 is impossible.

In this case, unnecessary electric lines may be removed by virtue of use of the wireless power supply. Accordingly, appearance of the flexible display mounted to the wall may be simple yet refined.

Figure 19A:
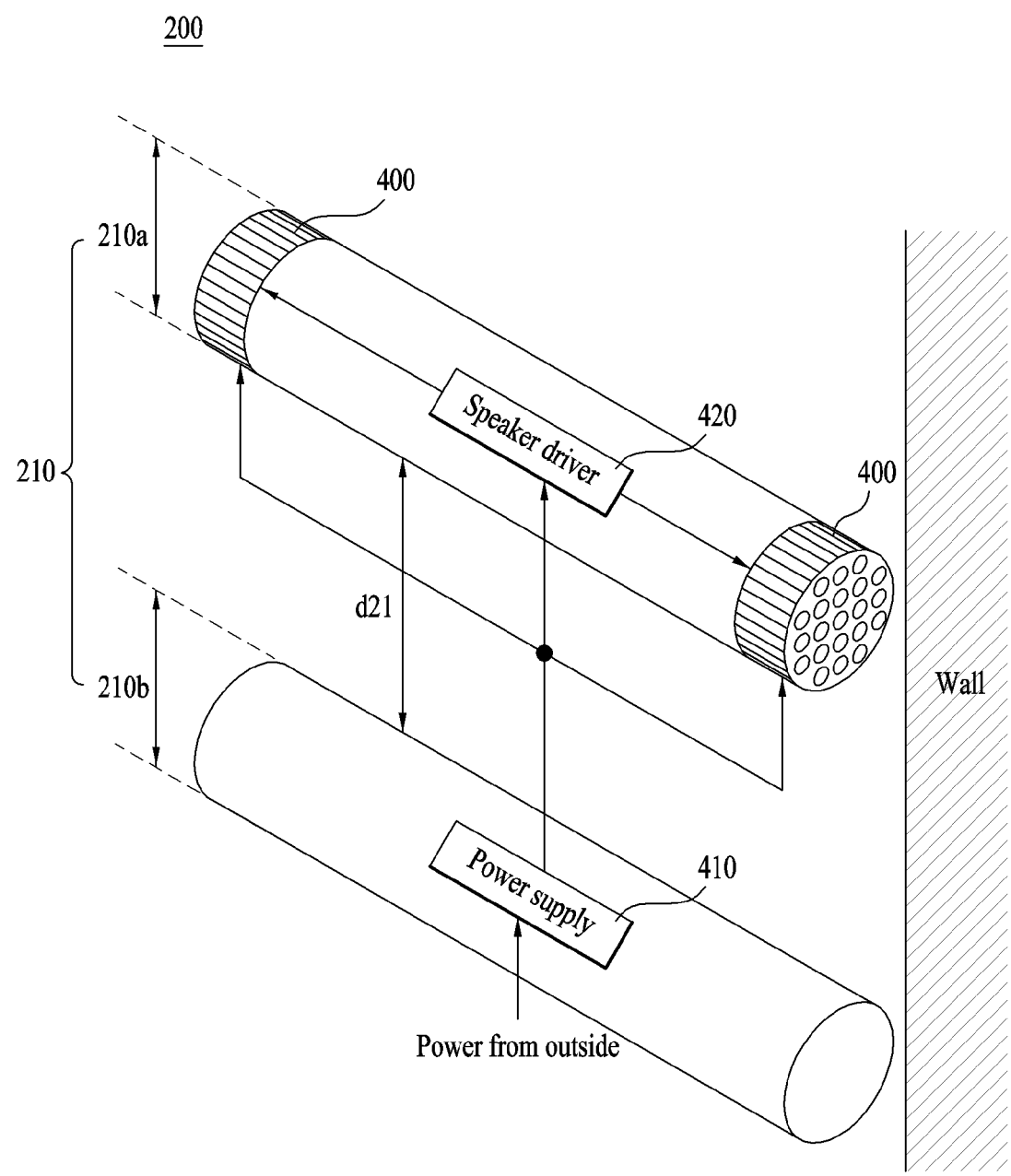
FIGS. 19A to 19C are views illustrating a support bar having a plurality of bodies.
Figure 19B:
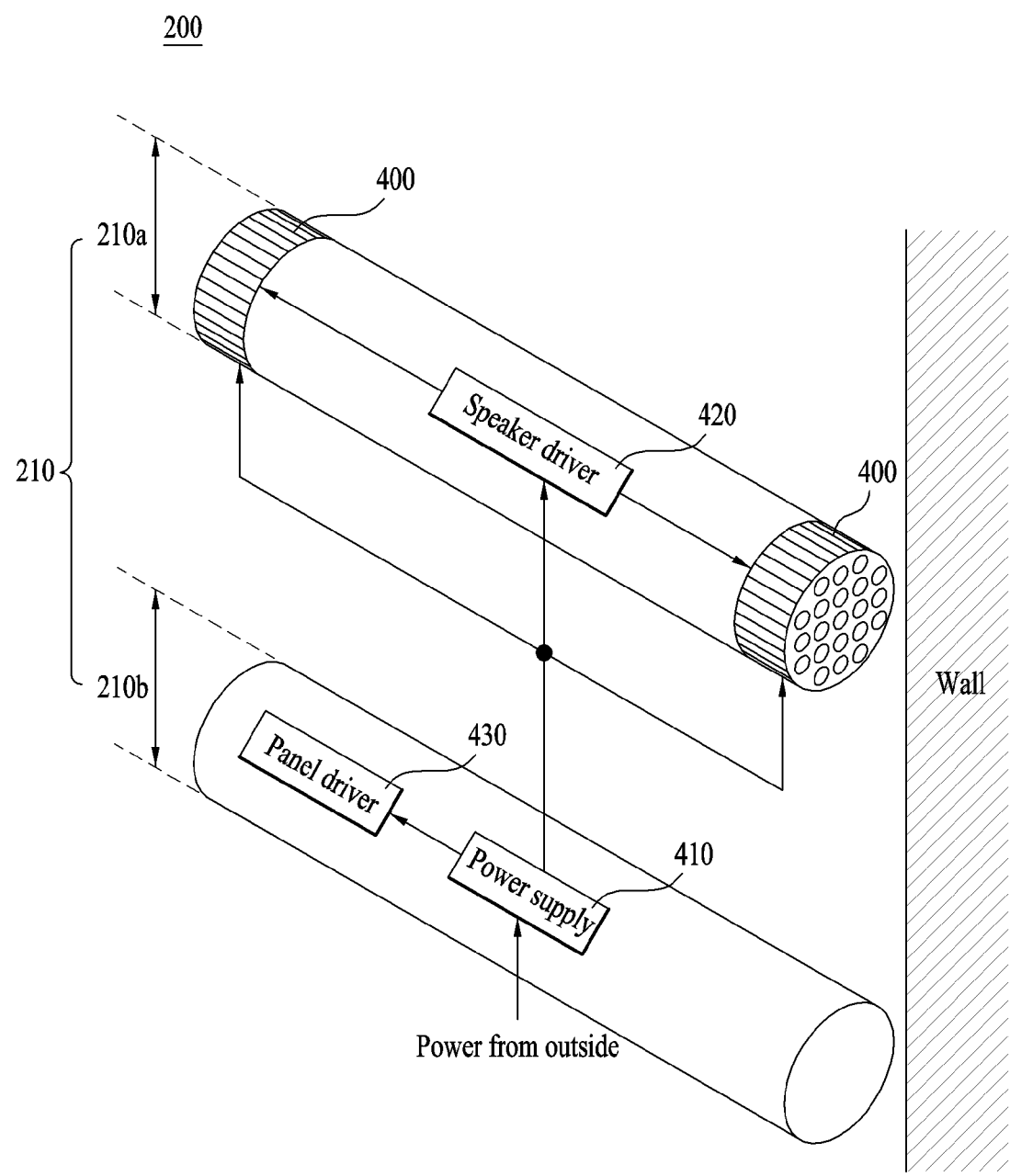
Figure 19C:
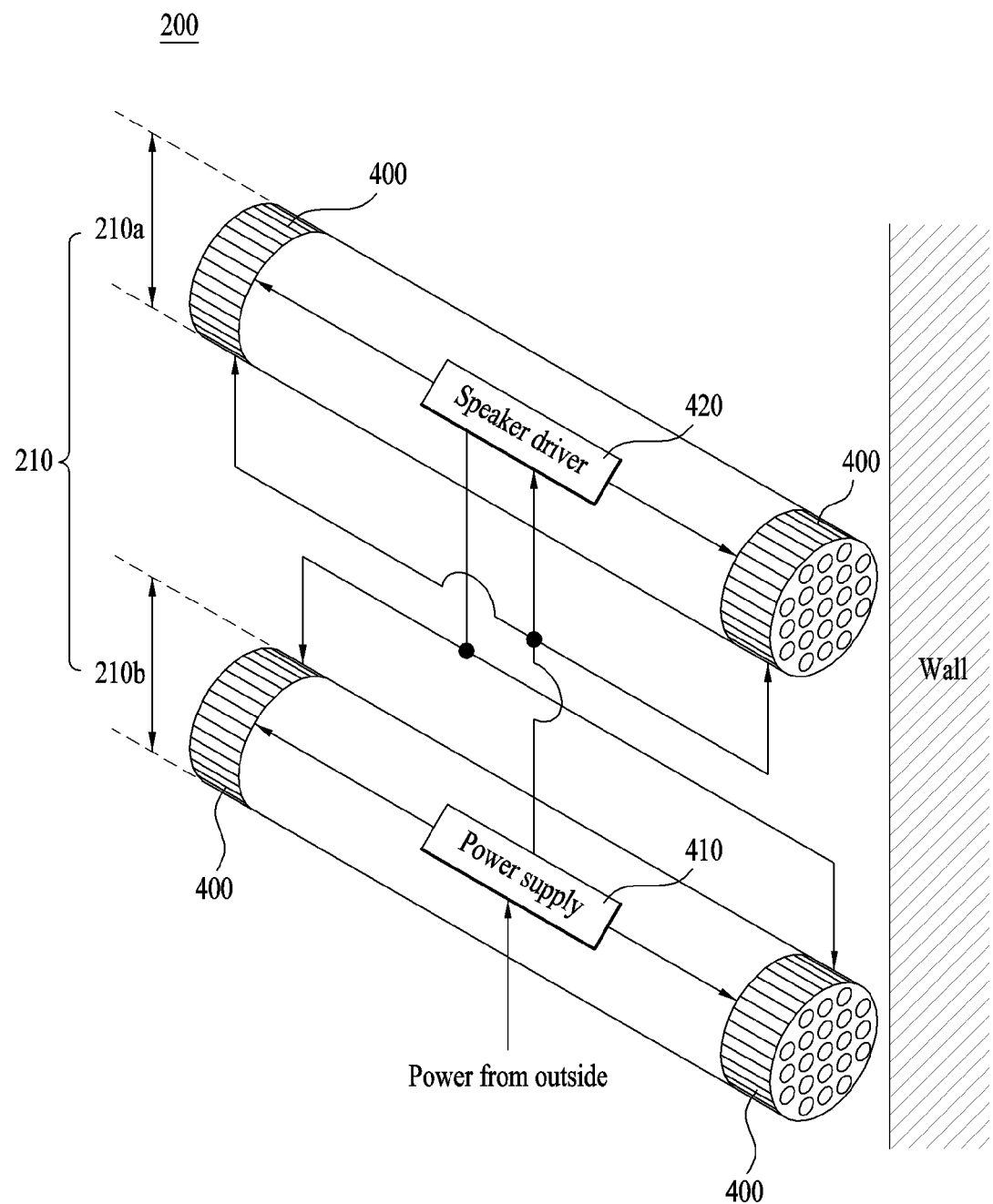

FIGS. 19A to 19C are views illustrating a support bar having a plurality of bodies. FIGS. 19A and 19B are views illustrating the case in which speakers are mounted only to one of bodies. FIG. 19C is a view illustrating the case in which speakers are mounted to a plurality of bodies.

As illustrated in FIGS. 19A to 19C, the illustrated support bar 200 may include a plurality of bodies 210.

For example, the body 210 may include a main body 210a and an auxiliary body 210b.

The main body 210a functions to support the bending section of the display panel. A single main body 210a or a plurality of main bodies 210a may be provided.

The auxiliary body 210b is arranged to be spaced apart from the main body 210a by a predetermined distance d21. The auxiliary body 210b functions to support a portion of the display panel, except for the bending section. A single auxiliary body 210b or a plurality of auxiliary bodies 210b may be provided.

In this case, the main body 210a and auxiliary body 210b may be electrically connected.

As illustrated in FIGS. 19A and 19B, speakers 400 may be mounted only to the main body 210a. Alternatively, as illustrated in FIG. 19C, the speakers 400 may be mounted not only to the main body 210a, but also to the auxiliary body 210b.

Meanwhile, the body 210 may include a speaker driver 420 for driving the speakers 400, and a power supply 410 for supplying electric power to the speaker driver and the speakers 400. The speaker driver 420 and power supply 410 may be arranged at the plurality of bodies 210, to be separate from each other.

For example, the speaker driver 420 is arranged at the main body 210a, whereas the power supply 410 may be arranged at the auxiliary body 210b while being electrically connected to the speaker driver 420.

If necessary, as illustrated in FIG. 19B, a panel driver 430 to drive the display panel 100 may be additionally arranged at the auxiliary body 210b.

When circuit units such as the speaker driver 420 and power supply 410 are arranged at a plurality of bodies 210, as described above, it may be possible to reduce weight of the display panel 100 and, as such, the display panel may be stably mounted to a wall.

In addition, various circuits may be arranged at the bodies 210 of the support bar 200, it may be possible to reduce weight of the bodies 200 and, as such, the bodies 210 of the support bar 200 may be stably fixed to a wall.

Figure 20A:
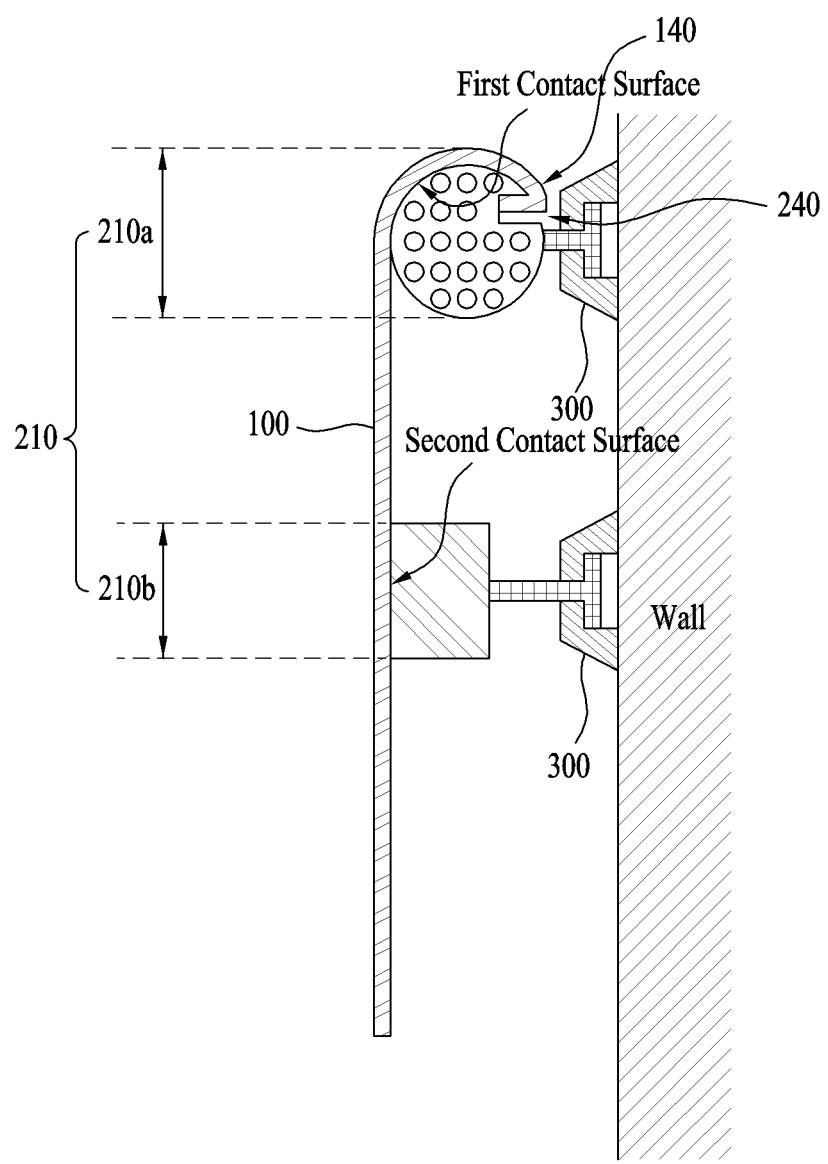
Figure 20B:
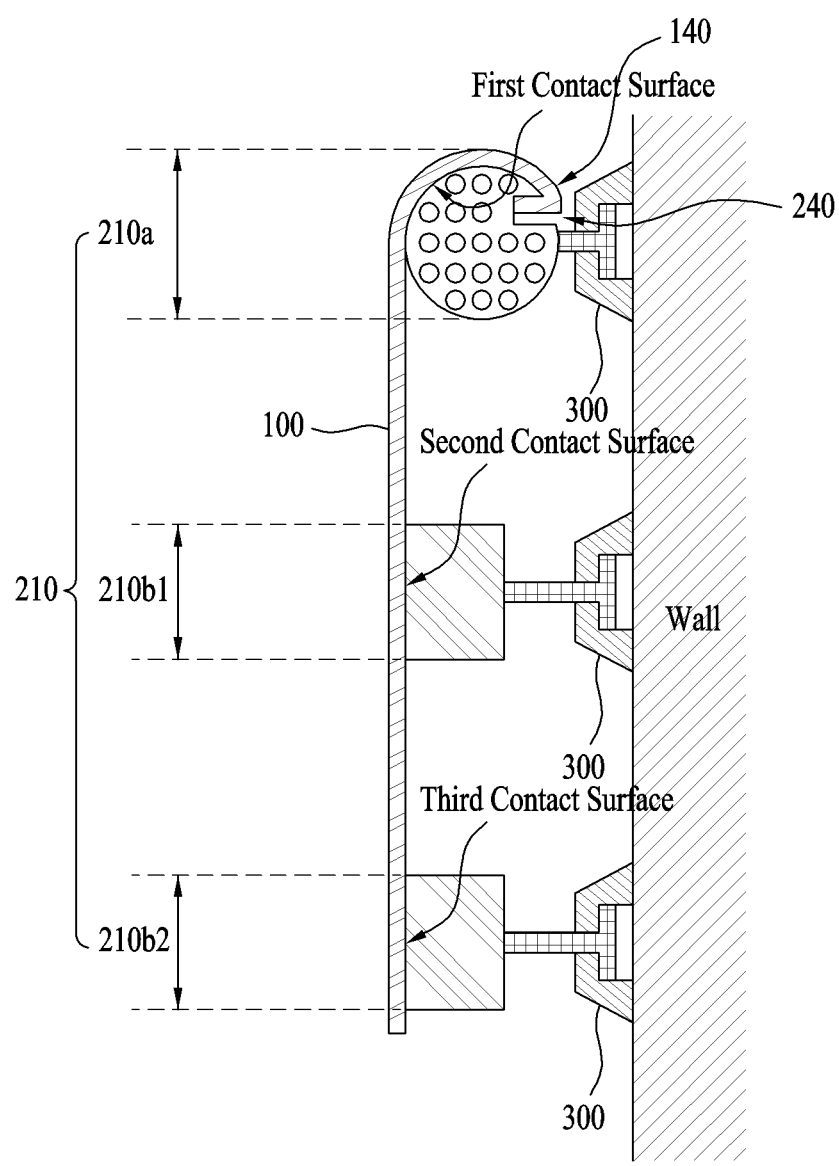

FIGS. 20A to 20C are views illustrating auxiliary bodies of support bars. FIGS. 20A and 20B are views illustrating a support bar having a single auxiliary body. FIG. 20C is a view illustrating a support bar having a plurality of auxiliary bodies.

As illustrated in each of FIGS. 20A to 20C, the body 210 of the illustrated support bar 200 may include a main body 210a and an auxiliary body 210b.

In this case, the main body 210a functions to support the bending section of the display panel 100. The main body 210a may have a curved surface, as in the bending section of the display panel 100.

For example, the main body 210a may contact the bending section of the display panel 100 at a first contact surface thereof.

Meanwhile, the main body 210a may be provided with a fastening groove 240 to receive the fastening protrusion 140 of the display panel 100 and, as such, the display panel 100 may be fastened to the main body 210a.

The main body 210a may be fixed to a wall by the bracket 300.

Meanwhile, as illustrated in FIG. 20A, the auxiliary body 210b may have a flat surface at a region thereof contacting the display panel 100.

For example, the auxiliary body 210b may contact the flat portion of the display panel 100 at a second contact surface thereof.

The auxiliary body 210b may be fixed to a wall by a bracket 300 attached to the wall.

Referring to FIG. 20B, first and second auxiliary bodies 210b1 and 210b2 are illustrated. Each of the first and second auxiliary bodies 210b1 and 210b2 may have a flat surface at a region thereof contacting the display panel 100.

For example, the first auxiliary body 210b1 may contact the flat portion of the display panel 100 at a second contact surface thereof, and the second auxiliary body 210b2 may contact the flat portion of the display panel 100 at a third contact surface thereof.

The first and second auxiliary bodies 210b1 and 210b2 may be fixed to a wall by brackets 300 attached to the wall.

Referring to FIG. 20C, first and second main bodies 210a1 and 210a2 and an auxiliary body 210b are illustrated. Each of the first and second main bodies 210a1 and 210a2 may have a curved surface at a region thereof contacting the display panel 100, whereas the auxiliary body 210b has a flat surface at a region thereof contacting the display panel 100.

Thus, the first main body 210a1 may contact an upper bending section of the display panel 100, whereas the second main body 210a2 may contact a lower bending section of the display panel 100.

Since the body 210 of the support bar 200 may include a plurality of main bodies 210a and a plurality of auxiliary bodies 210b, as described above, the support bar 200 may stably support the display panel 100.

Figure 21A:
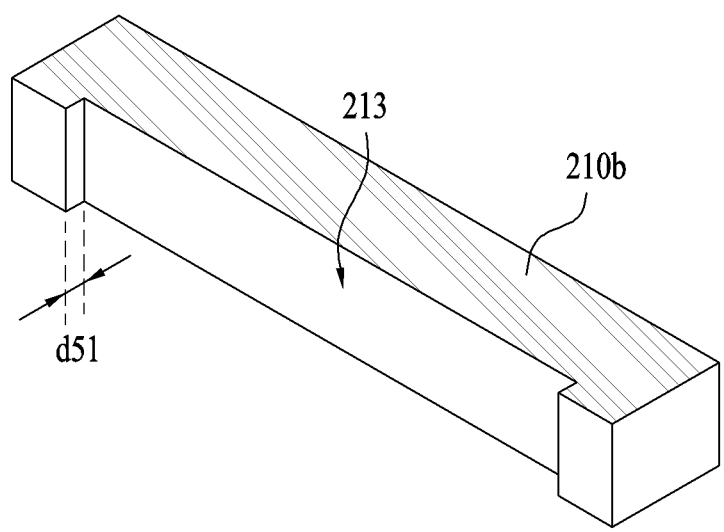
FIGS. 21A to 21C are views illustrating a movement preventing groove for preventing movement of the auxiliary body.
Figure 21B:
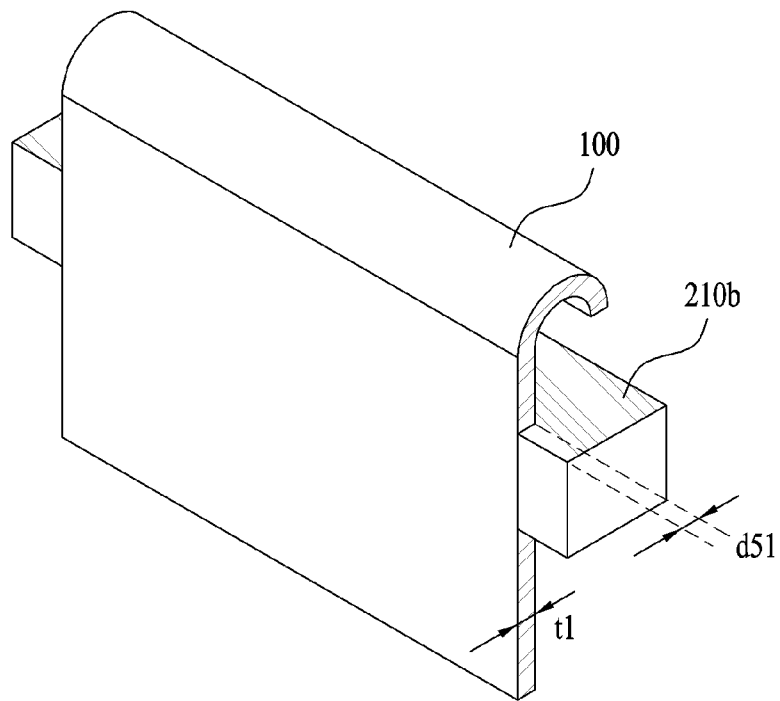
Figure 21C:
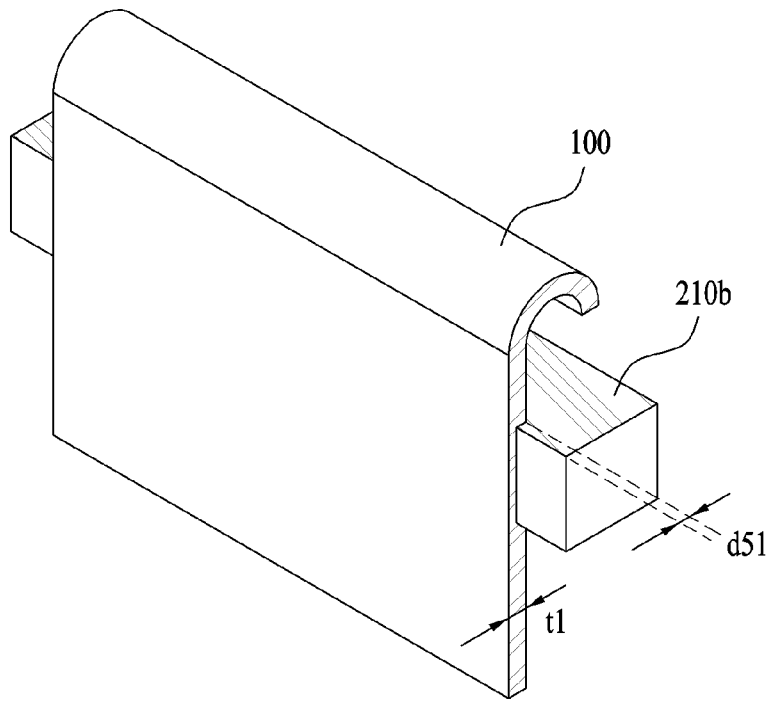

FIGS. 21A to 21C are views illustrating a movement preventing groove for preventing movement of the auxiliary body. FIG. 21A is a view illustrating the movement preventing groove. FIGS. 21B and 21C are views illustrating a state in which the display panel is fastened to the movement preventing groove.

As illustrated in FIGS. 21A to 21C, the auxiliary body 210b may have a flat surface at a region thereof contacting the display panel 100.

In this case, the auxiliary body 210b may be provided with a movement preventing groove 213 at a region thereof contacting the display panel 100, to fix the display panel 100.

In this case, the movement preventing groove 213 may have a depth d51 equal to or smaller than the thickness t1 of the display panel 100.

When the movement preventing groove 213 is provided at the auxiliary body 210b, as described above, the display panel 100 may be stably fixed and, as such, it may be possible to prevent the display panel 100 from being damaged by external impact.

Figure 22:
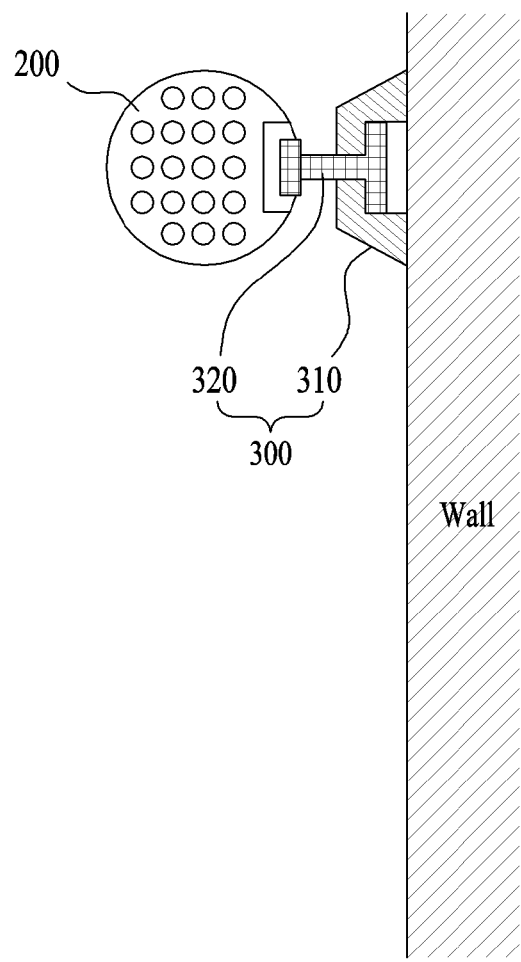
FIG. 22 is a sectional view illustrating a bracket to fix the support bar.

FIG. 22 is a sectional view illustrating the bracket to fix the support bar.

As illustrated in FIG. 22, the bracket 300 may be fixed to a wall in a state of being coupled to the support bar 200.

In this case, the bracket 300 may include a fixed section 310 and a fastening pin 320. The fixed section 310 may include at least one hole. The fixed section 310 may be attached to a wall.

In this case, the hole of the fixed section 310 may include an insertion hole, into which the fastening pin 320 is inserted, and a seating hole, in which the fastening pin 320 is seated.

The fastening pin 320 may be fastened to the support bar 200 in a state of being inserted into the hole of the fixed section 310. The fastening pin 320 may include a first pin having a first diameter, and a second pin connected to the first pin while having a second diameter.

In this case, the first diameter and second diameter may be different.

Thus, the bracket 300 may be configured to be attached to a wall in order to stably fix the support bar 200 and to allow easy attachment and detachment of the support bar 200.

Figure 23:
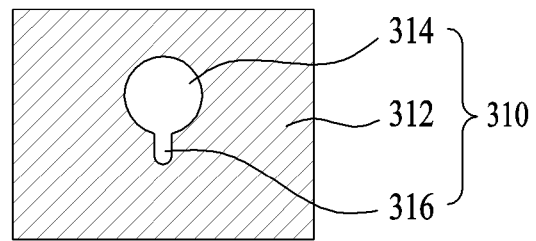
FIG. 23 is a view illustrating a fixed section of the bracket.
Figure 24A:
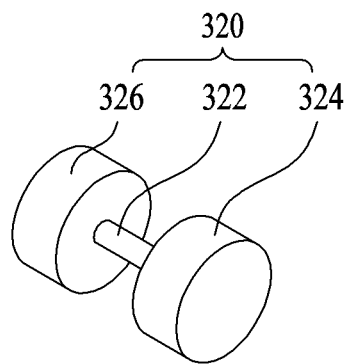
FIGS. 24A to 24C are views illustrating fastening pins of brackets, respectively.
Figure 24B:
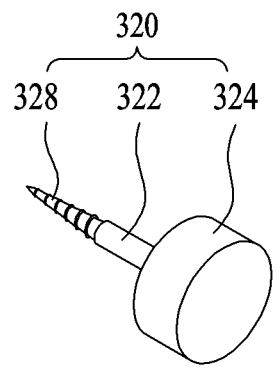
Figure 24C:
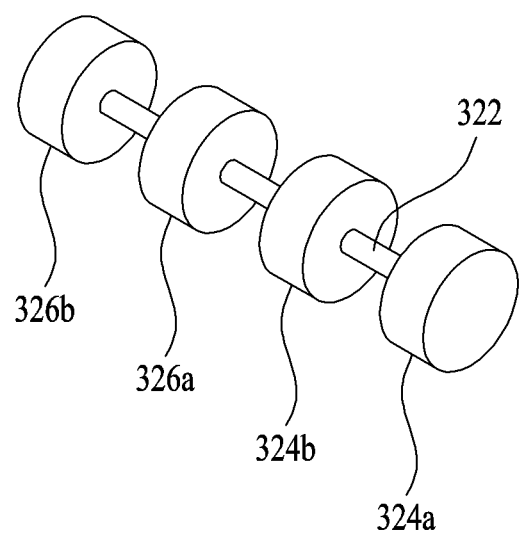

FIG. 23 is a view illustrating the fixed section of the bracket. FIGS. 24A to 24C are views illustrating fastening pins of brackets, respectively.

As illustrated in FIG. 23, the fixed section 310 of the bracket 300 may include a body 312, and at least one hole, into which the fastening pin 320 is inserted.

In this case, the body 312 of the fixed section 310 may include an insertion hole 314, into which the fastening pin 320 is inserted, and a seating hole 316, in which the fastening pin 320 is seated.

As illustrated in FIG. 24A, the fastening pin 320 may include a first pin 324 having a first diameter, a second pin 326 having a second diameter, and a connecting portion for connecting the first pin 324 and second pin 326.

In this case, the connecting portion 326 may have a smaller diameter than the first pin 324 and second pin 326.

In addition, the diameter of the connecting portion 326 may be equal to or smaller than the diameter of the seating hole 316 in the fixing section 310.

The diameters of the first pin 324 and second pin 326 may be equal to or greater than the diameter of the insertion hole 314 in the fixing section 310.

If necessary, the diameters of the first pin 324 and second pin 326 may be equal or different.

The first pin 324 may be inserted into the body 312 of the fixing section 310, whereas the second pin 326 may be inserted into the body of the support bar.

The connecting portion 322 of the fastening pin 300 may be seated in the seating hole 316 of the fixing section 310 while being exposed to an external space between the support bar 200 and the bracket 300.

Meanwhile, as illustrated in FIG. 24B, the fastening pin 320 may include a first pin 324 having a first diameter, a screw 328, and a connecting portion 322 for connecting the first pin 324 and screw 328.

In this case, the connecting portion 326 may have a smaller diameter than the first pin 324.

In addition, the diameter of the connecting portion 326 may be equal to or greater than the diameter of the seating hole 316 in the fixing section 310.

The first pin 324 may be inserted into the body 312 of the fixing section 310. The screw 328 may be inserted into the body section of the support bar 200.

The connecting portion 322 of the fastening pin 300 may be seated in the seating hole 316 of the fixing section 310 while being exposed to an external space between the support bar 200 and the bracket 300.

Meanwhile, as illustrated in FIG. 24C, the fastening pin 320 may include a plurality of first pins 324a and 324b having a first diameter, a plurality of second pins 326a and 326b having a second diameter, and a connecting portion 322 for connecting the first pins 324a and 324b and the second pins 326a and 326b.

In this case, the first pins 324a and 324b may be inserted into the body 312 of the fixing section 310. The second pins 326a and 326b may be inserted into the body section of the support bar 200.

The connecting portion 322 of the fastening pin 300 may be seated in the seating hole 316 of the fixing section 310 while being exposed to an external space between the support bar 200 and the bracket 300.

The fastening pin 320, which has the plurality of first pins 324a and 324b and the plurality of second pins 326a and 326b, may adjust the distance between the bracket 300 and the support bar 200 and, as such, the distance between the display panel and the wall may be adjusted.

Accordingly, the wall-mounted flexible display of the present invention may be freely and conveniently mounted to a wall.

In addition, since the distance between the display panel and the wall may be adjusted, using the fastening pin 320 of the bracket 300, there is an advantage in that the space between the display panel and the wall may be freely utilized.

As apparent from the above description, in accordance with one embodiment of the present invention, it may be possible to simply and stably mount the display panel to a wall by configuring the bending section of the display panel such that the bending section is hooked on the support bar fixed to the wall.

Meanwhile, in accordance with another embodiment of the present invention, it may be possible to separate the speakers from the display panel by arranging the speakers at the support bar fixed to a wall and, as such, the speakers may be installed while having various arrangements.

In addition, in accordance with another embodiment of the present invention, an auxiliary display may be arranged at the bending section of the display panel and, as such, display of various functions for recognition of the functions may be possible. In addition, a mood lighting function according to ambient brightness may be carried out.

The wall-mounted flexible display according to the present invention is not limited to the configurations and methods according to the above-described embodiments. The embodiments may be completely or partially combined to realize various modifications.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. In addition, such modifications, additions and substitutions should not be separately determined based on the technical idea or prospect of the present invention.

INDUSTRIAL APPLICABILITY

The present invention is applicable to a wall-mounted flexible display capable of being hung on a wall. Accordingly, the present invention has industrial applicability.

The invention claimed is:
1. A wall-mounted flexible display comprising:
a display panel having a bending section provided at an edge region of the display panel while having a curved structure;
a support bar contacting the bending section of the display panel, thereby supporting the display panel; and
a bracket coupled to the support bar while being fixed to a wall,
wherein the bending section of the display panel comprises at least two curved surfaces forming at least one inflection point, and the at least two curved surfaces comprise a first curved surface and a second curved surface, which have different curvatures.
2. The wall-mounted flexible display according to claim 1, wherein the first curved surface is immediately adjacent to an end portion of the display panel, the second curved surface is adjacent to the first curved surface while being spaced apart from the end portion of the display panel, and the curvature of the first curved surface is greater than the curvature of the second curved surface.

3. The wall-mounted flexible display according to claim 2, wherein the first curved surface is bent toward a back surface of the display panel.

4. The wall-mounted flexible display according to claim 3, wherein a fastening portion to be fastened to the support bar is provided at the first curved surface, and an auxiliary display for display of functions is provided at the second curved surface.

5. The wall-mounted flexible display according to claim 2, wherein the first curved surface is bent toward a front surface of the display panel.

6. The wall-mounted flexible display according to claim 5, wherein a fastening portion to be fastened to the support bar and an auxiliary display for display of functions are provided at the first curved surface.

7. The wall-mounted flexible display according to claim 6, wherein the auxiliary display is arranged at a rear surface of the display panel, and the fastening portion is arranged at the front surface of the display panel.

8. The wall-mounted flexible display according to claim 1, wherein the display panel comprises a main display arranged at a central region of the display panel, for display of images, and an auxiliary display arranged at the bending section, for display of functions.

9. The wall-mounted flexible display according to claim 8, wherein the auxiliary display displays at least one of an electrical connection state between the display panel and the support bar, an audio level state of speakers representing a plurality of frequency ranges, and an operation state of the display panel.

10. The wall-mounted flexible display according to claim 8, wherein the auxiliary display comprises at least one sensor for sensing ambient brightness and, performs a mood lighting function for adjusting luminance in accordance with ambient brightness.

11. The wall-mounted flexible display according to claim 1, wherein the bending section of the display panel is provided with at least one connecting terminal for electrical connection of the display panel to the support bar.

12. The wall-mounted flexible display according to claim 1, wherein the bending section of the display panel is provided with a plurality of function buttons for activation of functions of the display panel.

13. The wall-mounted flexible display according to claim 1, wherein the support bar comprises:

a body contacting the bending section of the display panel, thereby supporting the display panel;
speakers each arranged at a predetermined region of the body, to output an audio signal from the display panel; and
at least one connecting terminal arranged at a predetermined region of the body, for electrical connection between the speakers and the display panel.

14. The wall-mounted flexible display according to claim 13, wherein the body has a curved surface at a region thereof contacting the bending section of the display panel, and the curved surface of the body has a curvature equal to the curvature of the first curved surface in the bending section or the curvature of the second curved surface in the bending section.

15. The wall-mounted flexible display according to claim 13, wherein the body comprises a speaker driver for driving the speakers, and a power supply for supplying electric power to the speaker driver and the speakers.

16. The wall-mounted flexible display according to claim 13, wherein the body comprises at least one main body for supporting the bending section of the display panel, and at least one auxiliary body spaced apart from the main body by a predetermined distance, to support a region of the display panel, except for the bending section, and the main body and the auxiliary body are electrically connected.

17. The wall-mounted flexible display according to claim 13, wherein the speakers are arranged at opposite lateral ends of the body exposed from the display panel, respectively.

18. The wall-mounted flexible display according to claim 1, wherein the bracket comprises a fixed section attached to the wall while having at least one hole, and a fastening pin inserted into the hole of the fixed section, and fastened to the support bar.

19. The wall-mounted flexible display according to claim 18, wherein the hole of the fixed section comprises an insertion hole, into which the fastening pin is inserted, and a seating hole, in which the fastening pin is seated.

20. The wall-mounted flexible display according to claim 18, wherein the fastening pin comprises a first pin having a first diameter, and a second pin connected to the first pin while having a second diameter, and the first diameter and the second diameter are different.

* * * * *

UNITED STATES PATENT AND TRADEMARK OFFICE
CERTIFICATE OF CORRECTION

PATENT NO. : 9,558,685 B2  
APPLICATION NO. : 14/895455  
DATED : January 31, 2017  
INVENTOR(S) : Cheonhee Lee et al.

Page 1 of 1

It is certified that error appears in the above-identified patent and that said Letters Patent is hereby corrected as shown below:

On the Title Page

Item (72) Inventors replace with: Cheonhee LEE, Seoul (KR); Dongwon CHOI, Seoul (KR); Sangchul HAN, Seoul (KR); Sunjung HWANG, Seoul (KR)

Signed and Sealed this  
Ninth Day of May, 2017

Michelle K. Lee  
*Director of the United States Patent and Trademark Office*